(12) United States Patent
Groeneweg et al.

(10) Patent No.: US 9,273,437 B2
(45) Date of Patent: Mar. 1, 2016

(54) MOBILE BARRIER

(71) Applicant: Concaten, Inc., Golden, CO (US)

(72) Inventors: Kevin K. Groeneweg, Golden, CO (US); David Meyerink, Golden, CO (US); Duane Meyerink, Golden, CO (US); LeRoy Severson, Golden, CO (US)

(73) Assignee: Concaten, Inc., Golden, CO (US)

( * ) Notice: Subject to any disclaimer, the term of this patent is extended or adjusted under 35 U.S.C. 154(b) by 0 days.

(21) Appl. No.: 14/177,097

(22) Filed: Feb. 10, 2014

(65) Prior Publication Data

US 2014/0161522 A1    Jun. 12, 2014

Related U.S. Application Data

(62) Division of application No. 13/686,756, filed on Nov. 27, 2012, now Pat. No. 8,657,525, which is a division of application No. 12/347,467, filed on Dec. 31, 2008, now Pat. No. 8,322,945.

(60) Provisional application No. 61/061,567, filed on Jun. 13, 2008, provisional application No. 61/091,246, filed on Aug. 22, 2008, provisional application No. 61/122,941, filed on Dec. 16, 2008.

(51) Int. Cl.
| | | |
|---|---|---|
| *E01F 15/10* | (2006.01) | |
| *E01F 15/14* | (2006.01) | |
| *E01F 9/012* | (2006.01) | |
| *E01F 15/00* | (2006.01) | |
| *B60P 3/00* | (2006.01) | |

(52) U.S. Cl.
CPC . *E01F 15/14* (2013.01); *B60P 3/00* (2013.01); *E01F 9/0126* (2013.01); *E01F 15/00* (2013.01); *E01F 15/006* (2013.01); *E01F 15/148* (2013.01)

(58) Field of Classification Search
USPC .......... 280/411.1, 476.1, 482, 656; 404/6, 10; 296/187.01
IPC ......... E01F 15/00,15/10, 15/14, 15/145, 15/148
See application file for complete search history.

(56) References Cited

U.S. PATENT DOCUMENTS

| | | |
|---|---|---|
| 431,657 A | 7/1890 | Hale |
| 3,120,398 A | 2/1964 | Butterworth |

(Continued)

FOREIGN PATENT DOCUMENTS

| | | |
|---|---|---|
| DE | 806760 | 6/1951 |
| GB | 860338 | 2/1961 |
| WO | WO 93/12300 | 6/1993 |

OTHER PUBLICATIONS

International Preliminary Report on Patentability for PCT Application No. PCT/US08/88668, mailed Dec. 23, 2010.

(Continued)

*Primary Examiner* — Gary Hartmann
(74) *Attorney, Agent, or Firm* — Carl A. Hjort, III

(57) ABSTRACT

A safety trailer is shown, the device including first and second platforms, at least one of the first and second platforms having an axle and wheels attached thereto; a plurality of interconnected wall sections positioned between and connected to the first and second platforms, the plurality of wall sections defining a protected work area on a side of the trailer; and wherein each wall section has a longitudinal member extending a length of the wall section, the longitudinal member being positioned at the approximate position of a bumper of a vehicle colliding with the wall section.

6 Claims, 22 Drawing Sheets

(56) References Cited

U.S. PATENT DOCUMENTS

| | | | |
|---|---|---|---|
| 3,326,099 A | 6/1967 | Cova et al. | |
| 3,734,540 A | 5/1973 | Thiermann | |
| 3,774,940 A | 11/1973 | Merritts | |
| 3,790,321 A * | 2/1974 | Bunger | 425/63 |
| 3,952,453 A | 4/1976 | Amburgey | |
| 3,990,532 A | 11/1976 | Robinson | |
| 4,017,200 A | 4/1977 | Woods, Jr. | |
| 4,060,255 A | 11/1977 | Zimmerman | |
| 4,087,785 A | 5/1978 | Dodich | |
| 4,240,647 A | 12/1980 | Lewis | |
| 4,385,771 A | 5/1983 | Eckels | |
| 4,406,563 A | 9/1983 | Urlberger | |
| 4,494,892 A | 1/1985 | Wojciechowski | |
| 4,600,178 A | 7/1986 | Zucker et al. | |
| 4,601,509 A | 7/1986 | Ellis, Sr. | |
| 4,624,601 A | 11/1986 | Quittner | |
| 4,681,302 A | 7/1987 | Thompson | |
| 4,729,486 A | 3/1988 | Petzold et al. | |
| 4,773,629 A | 9/1988 | Yodock | |
| 4,869,617 A | 9/1989 | Chiodo | |
| 4,946,306 A | 8/1990 | Yodock | |
| 5,007,763 A | 4/1991 | Burgett | |
| 5,011,325 A | 4/1991 | Antonioli | |
| 5,033,905 A | 7/1991 | Schmidt et al. | |
| 5,057,820 A | 10/1991 | Markson et al. | |
| 5,088,874 A | 2/1992 | Quittner | |
| 5,101,927 A | 4/1992 | Murtuza | |
| 5,104,254 A | 4/1992 | Durand | |
| 5,104,255 A | 4/1992 | Bodensohn | |
| 5,123,773 A | 6/1992 | Yoduck | |
| 5,208,585 A | 5/1993 | Sprague | |
| 5,286,136 A | 2/1994 | Mandish et al. | |
| 5,292,467 A | 3/1994 | Mandish et al. | |
| 5,336,016 A | 8/1994 | Baatz | |
| 5,387,049 A | 2/1995 | Duckett | |
| 5,425,594 A | 6/1995 | Krage et al. | |
| 5,480,255 A | 1/1996 | Bernaquez et al. | |
| 5,498,101 A | 3/1996 | Braverman | |
| 5,531,540 A | 7/1996 | Wasserstrom et al. | |
| 5,611,641 A | 3/1997 | Christensen | |
| 5,688,071 A | 11/1997 | Owen | |
| 5,833,294 A | 11/1998 | Williams et al. | |
| 5,836,714 A | 11/1998 | Christensen | |
| 5,947,452 A | 9/1999 | Albritton | |
| 5,988,934 A | 11/1999 | Wasserstrom | |
| 6,098,767 A | 8/2000 | Unrath | |
| 6,183,042 B1 | 2/2001 | Unrath | |
| 6,213,047 B1 | 4/2001 | Means et al. | |
| 6,220,780 B1 | 4/2001 | Schindler et al. | |
| 6,231,065 B1 | 5/2001 | Brown | |
| 6,349,517 B1 | 2/2002 | Manley et al. | |
| 6,371,505 B1 | 4/2002 | Turner, II | |
| 6,409,417 B1 | 6/2002 | Muller et al. | |
| 6,450,522 B1 | 9/2002 | Yamada et al. | |
| 6,523,872 B2 | 2/2003 | Breed | |
| 6,565,108 B1 | 5/2003 | Gearhart | |
| 6,581,992 B1 | 6/2003 | Gertz | |
| 6,669,402 B1 | 12/2003 | Davis et al. | |
| 6,863,468 B2 | 3/2005 | Davis et al. | |
| 6,926,461 B1 | 8/2005 | Faller et al. | |
| 6,942,263 B2 | 9/2005 | Welch et al. | |
| 7,125,198 B2 | 10/2006 | Schiefferly et al. | |
| 7,341,397 B2 | 3/2008 | Murphy | |
| 7,354,218 B1 | 4/2008 | Dyke et al. | |
| 7,410,321 B1 | 8/2008 | Schiefferly et al. | |
| 7,572,022 B2 * | 8/2009 | Groeneweg | 362/26 |
| 7,901,117 B2 | 3/2011 | Groeneweg | |
| 8,322,945 B2 * | 12/2012 | Groeneweg et al. | 404/6 |
| 8,465,047 B2 * | 6/2013 | Groeneweg | 280/656 |
| 8,628,110 B2 * | 1/2014 | Groeneweg | 280/656 |
| 8,657,525 B2 * | 2/2014 | Groeneweg et al. | 404/6 |
| 8,740,241 B2 * | 6/2014 | Groeneweg | B60P 3/00 280/411.1 |
| 8,777,255 B2 * | 7/2014 | Groeneweg | E01F 15/148 280/482 |
| 8,845,229 B2 * | 9/2014 | Groeneweg | E01F 9/0126 280/656 |
| 2006/0044816 A1 | 3/2006 | Groeneweg | |
| 2007/0012534 A1 | 1/2007 | Murphy | |
| 2009/0166998 A1 * | 7/2009 | Groeneweg | 280/408 |
| 2010/0219611 A1 | 9/2010 | Groeneweg | |
| 2011/0163517 A1 | 7/2011 | Groeneweg | |
| 2014/0319805 A1 * | 10/2014 | Groeneweg | E01F 15/148 280/656 |
| 2015/0016881 A1 * | 1/2015 | Groeneweg | B60P 3/00 404/6 |
| 2015/0225913 A1 * | 8/2015 | Groeneweg | E01F 15/148 212/299 |

OTHER PUBLICATIONS

International Search Report for PCT Application No. PCT/US08/88668, mailed Jun. 1, 2009.
Written Opinion for PCT Application No. PCT/US08/88668, mailed Jun. 1, 2009.
U.S. Appl. No. 12/347,458, filed Dec. 31, 2008, Groeneweg.
Texas Transportation Institute, "Development of Functional Requirements for a Highly-Mobile Barrier System to Protect Highway Workers: Interim Report—Draft", May 2004, pp. 1-45.
Beason, et al., "Development of a Truck-Mounted Portable Maintenance Barrier", Research Report No. 262-5, Research Study No. 2-18-79-262, Safety Devices for Highway Work Zones, Texas Transportation Institute, Apr. 1984, pp. 1-82.
Background of the above-referenced Application (previously provided).

* cited by examiner

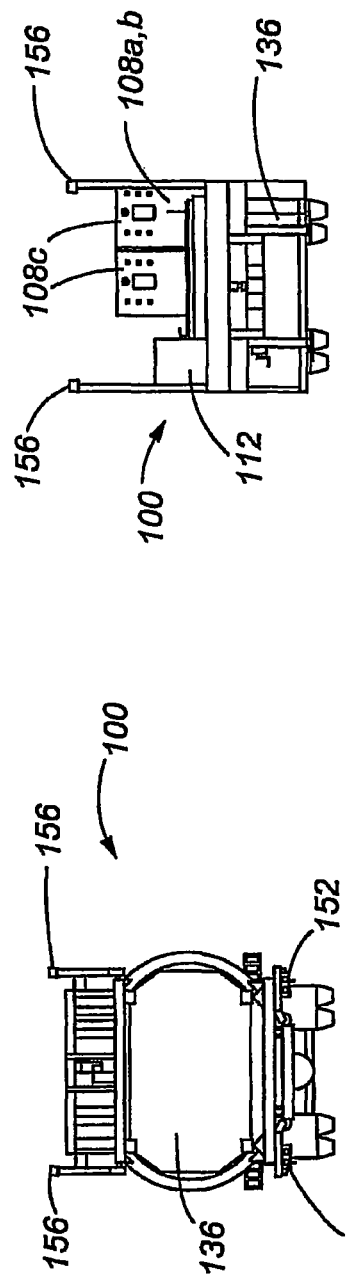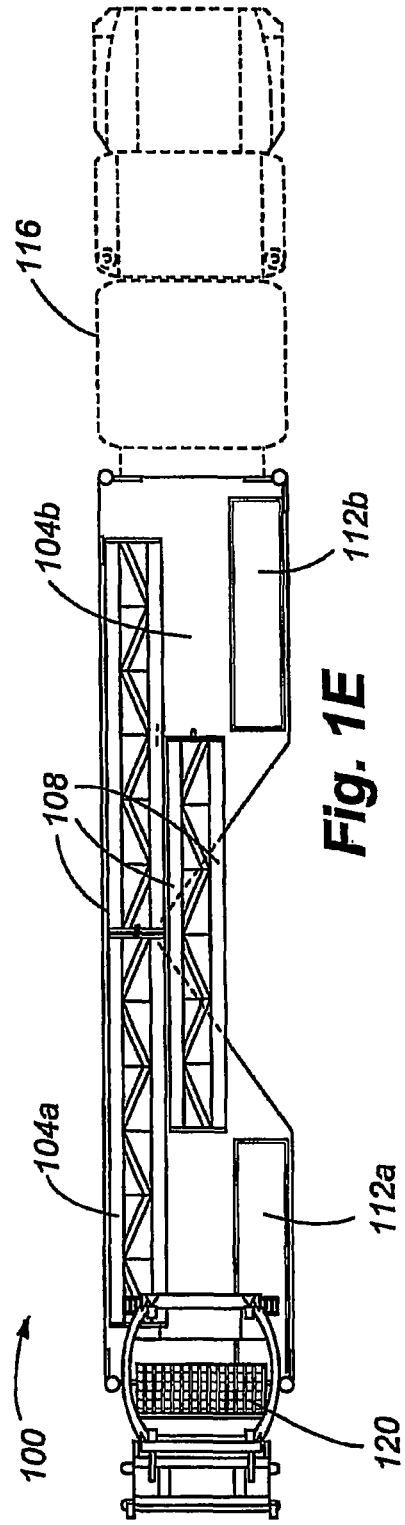

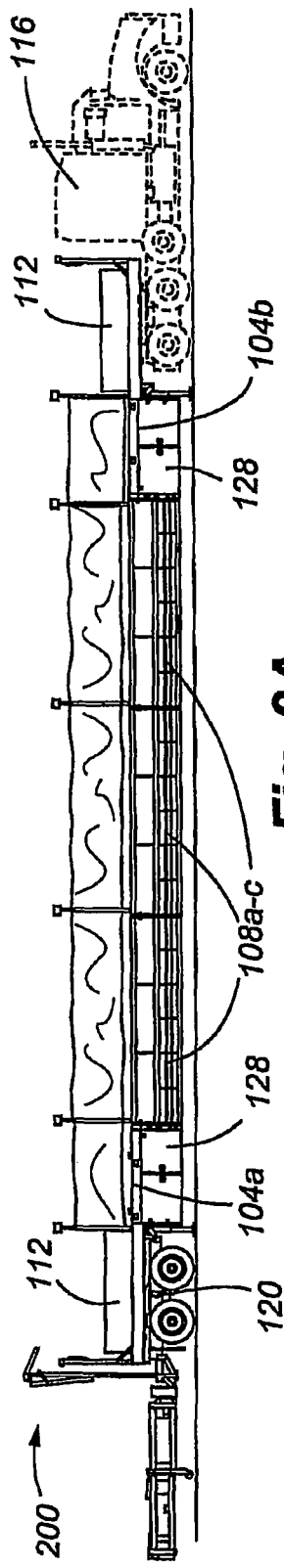
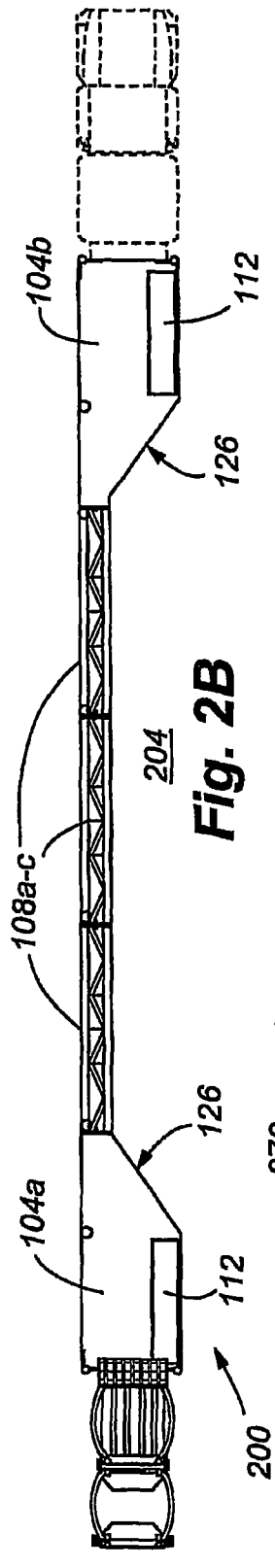
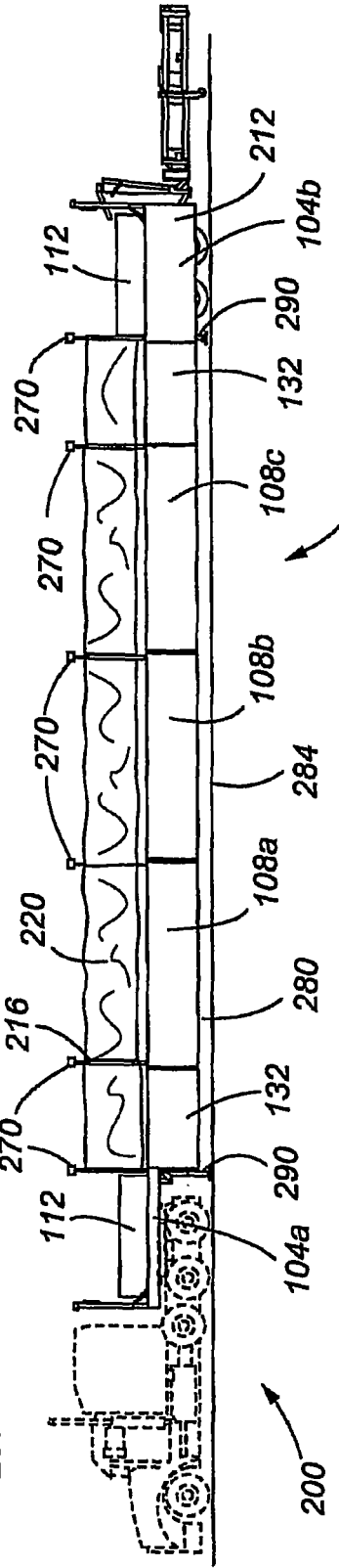

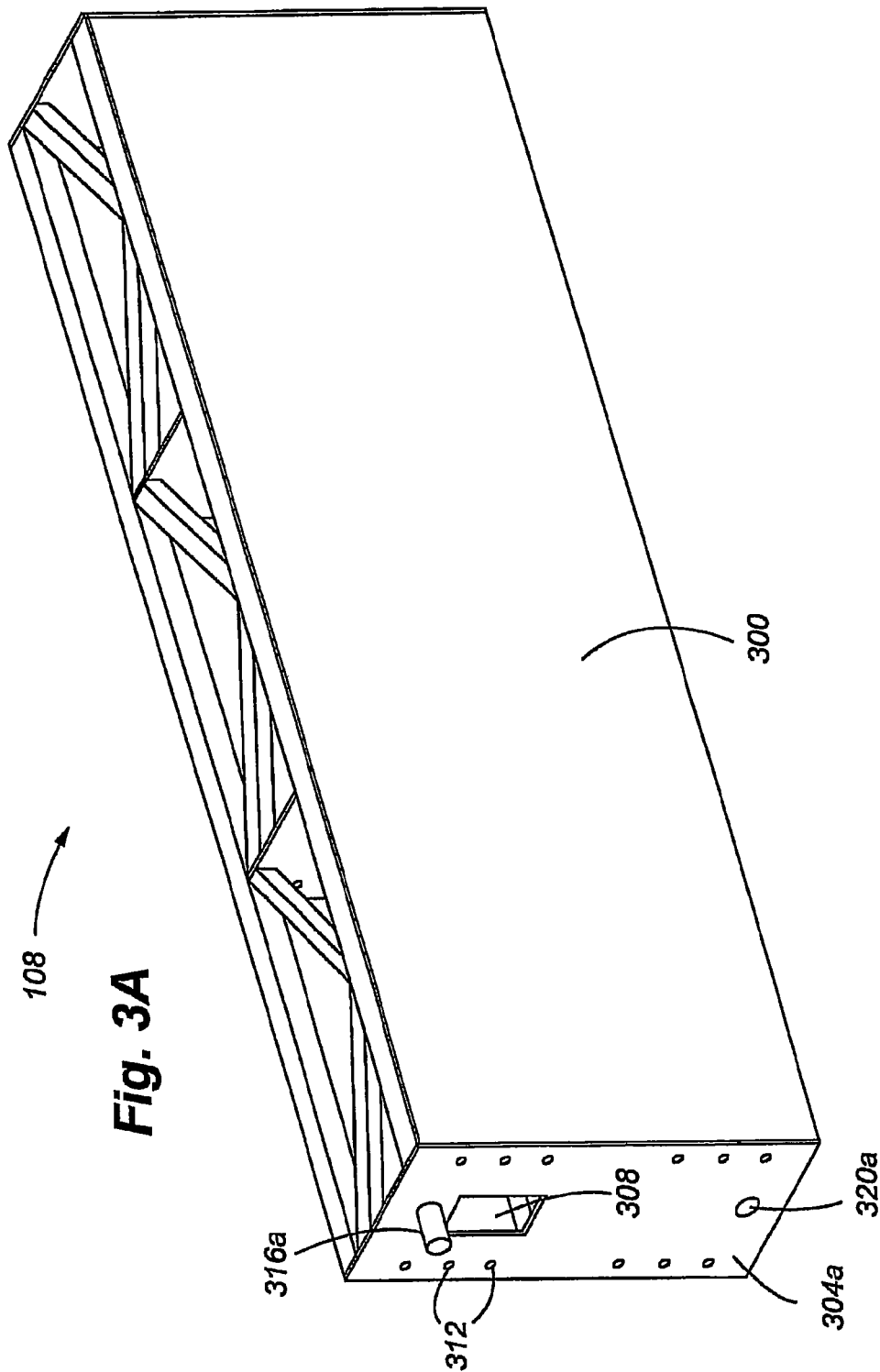

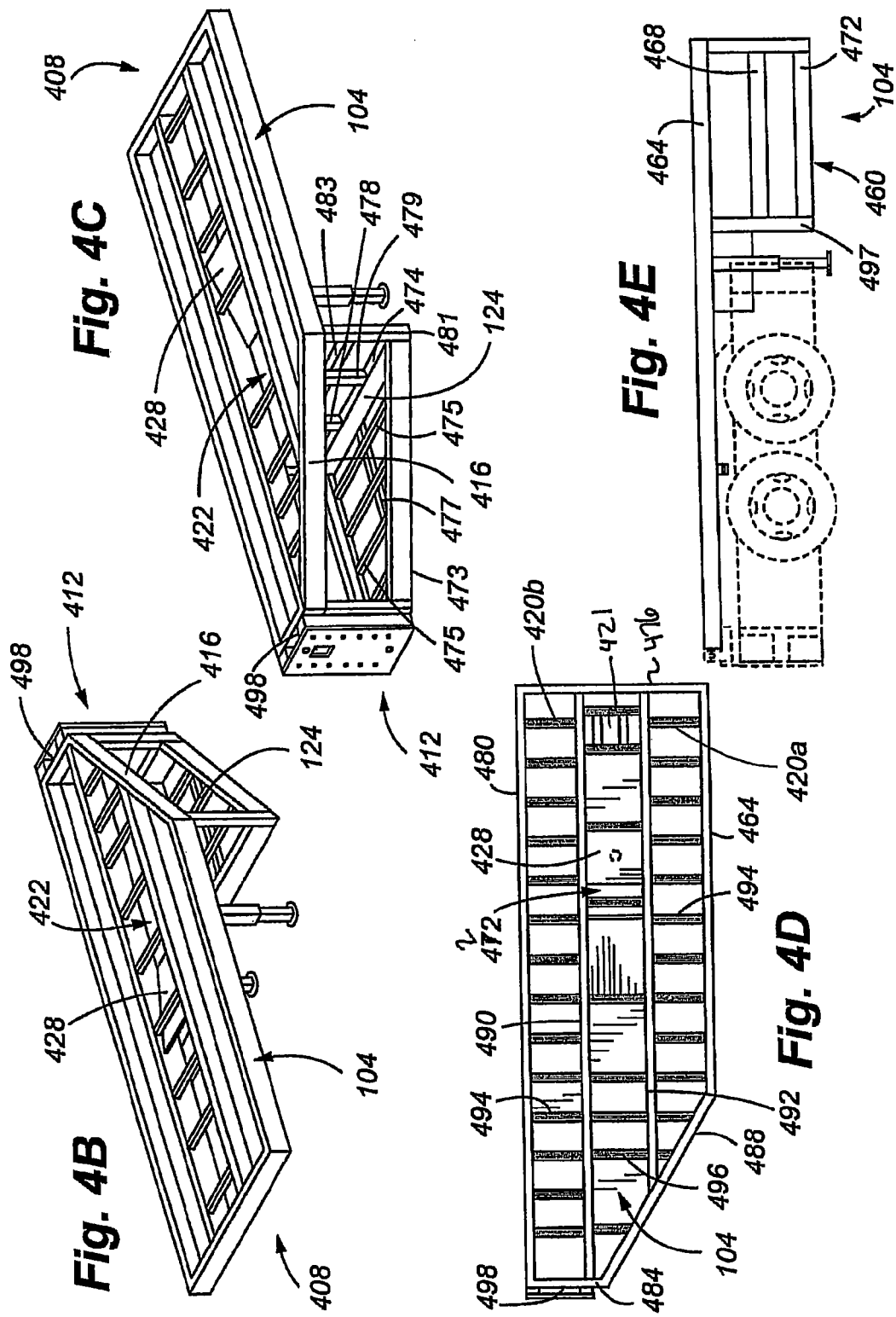

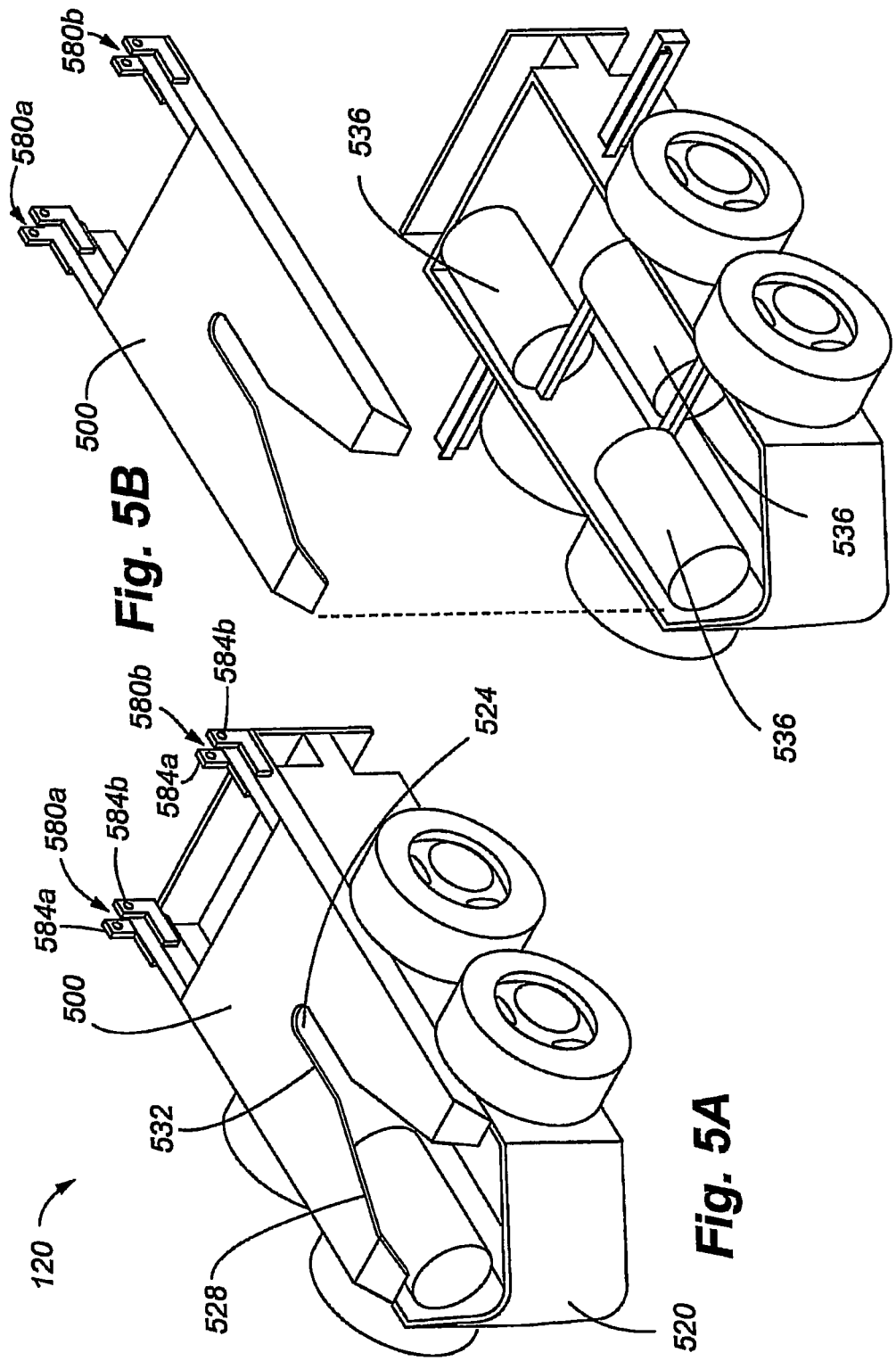

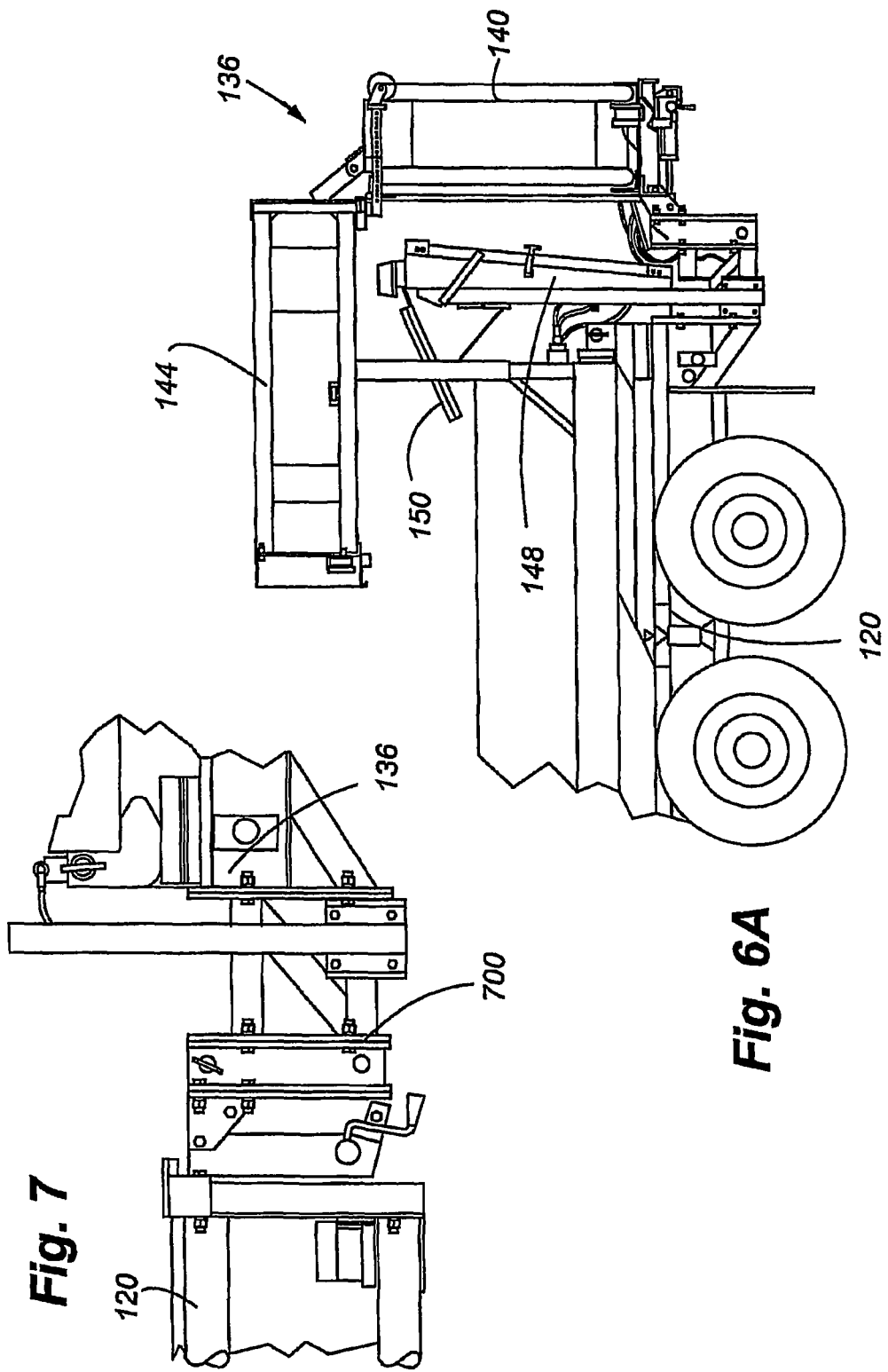

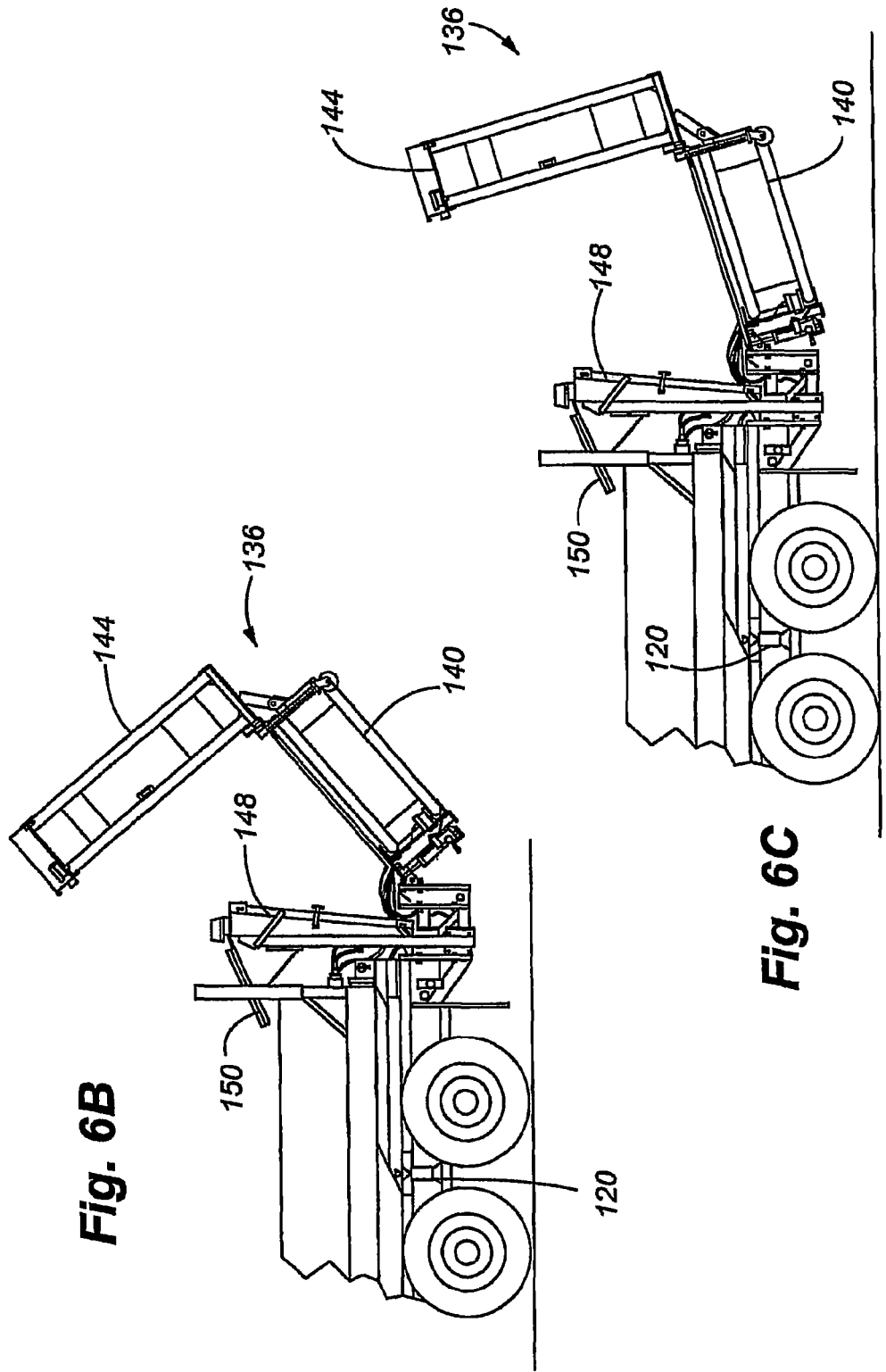

MOBILE BARRIER

CROSS REFERENCE TO RELATED APPLICATION

The present application is a divisional application of U.S. patent application Ser. No. 13/686,756, filed on Nov. 27, 2012, now U.S. Pat. No. 8,657,525, which is a divisional application of U.S. patent application Ser. No. 12/347,467, filed on Dec. 31, 2008, now U.S. Pat. No. 8,322,945. The present application claims the benefits of U.S. Provisional Application Ser. No. 61/061,567, filed Jun. 13, 2008, entitled "MOBILE BARRIER", and 61/091,246, filed Aug. 22, 2008, entitled "MOBILE BARRIER", and 61/122,941, filed Dec. 16, 2008, entitled "MOBILE BARRIER" each of which is incorporated herein by this reference in its entirety.

FIELD OF THE INVENTION

The present invention relates generally to the field of trailers and other types of barriers used to shield road construction workers from traffic. More specifically, the present invention discloses a safety and construction trailer having a fixed safety wall and semi tractor hookups at both ends.

BACKGROUND

Various types of barriers have long been used to protect road construction workers from passing vehicles. For example, cones, barrels and flashing lights have been widely used to warn drivers of construction zones, but provide only limited protection to road construction workers in the event a driver fails to take heed. Some construction projects routinely park a truck or other heavy construction equipment in the lane between the construction zone and on-coming traffic. This reduces the risk of worker injury from traffic in that lane, but does little with regard to errant traffic drifting laterally across lanes into the construction zone. In addition, conventional barriers require significant time and effort to transport to the work site, and expose workers to significant risk of accident while deploying the barrier at the work site. Therefore, a need exists for a safety barrier that can be readily transported to, and deployed at the work site. In addition, the safety barrier should protect against lateral incursions by traffic from adjacent lanes, as well as traffic in the same lane.

SUMMARY

These and other needs are addressed by the various embodiments and configurations of the present invention. In contrast to the prior art in the field, the present invention can provide a safety trailer with a fixed safety wall and semi tractor hookups at one or both ends.

In a first embodiment, a safety trailer includes:

(a) first and second removably interconnected platforms, at least one of the first and second platforms being engaged with an axle and wheels, the first and second platforms defining a trailer; and (b) a plurality of wall sections supported by the trailer, the wall sections, when deployed to form a barrier wall, are positioned between the first and second interconnected platforms (c) wherein at least one of the following is true:

(c1) the trailer supports a ballast member, the ballast member being positioned near a first side of the trailer and the ballast member near a second, opposing side of the trailer, the ballast member offsetting, at least partially, a weight of the plurality of wall sections, and (c2) the axle of the trailer is engaged with a vertical adjustment member, the vertical adjustment member selectively adjusting a vertical position of a surface of the trailer.

In a second embodiment, a safety trailer includes:

(a) first and second platforms;

(b) a plurality of interconnected wall sections positioned between and connected to the first and second platforms, the plurality of wall sections defining a protected work area on a side of the trailer;

(c) wherein each wall section has at least one of the following features:

(c1) a plurality of interconnected levels, each level comprising first and second longitudinal members, a plurality of truss members interconnecting the first and second longitudinal members, and being connected to an end member;

(c2) a longitudinal member extending a length of the wall section, the longitudinal member being positioned at the approximate position of a bumper of a vehicle colliding with the wall section;

(c3) a plurality of full height and partial height wall members, the full height wall members extending substantially the height and width of the wall section and the partial height wall members extending substantially the width but less than the height of the wall section, the full height and partial height members alternating along a length of the wall section; and (c4) first and second end members, each of the first and second end members comprising an outwardly projecting alignment member and an alignment-receiving member, the first and second end members having the alignment and alignment-receiving members positioned in opposing configurations.

In a third embodiment, a trailer includes:

(a) a trailer body;

(b) a removable caboose engageable with the trailer body, the caboose having a nose portion and at least one axle and wheels; and (c) a caboose receiving member, the caboose receiving member comprising an alignment device, wherein, in a first mode when the caboose is moved into engagement with the trailer body, the alignment device orients the caboose with a king pin mounted on the trailer body and, in a second mode when the caboose is engaged with the trailer body, the alignment device maintains a desired orientation of the caboose with the trailer.

In a fourth embodiment, a safety system includes:

(a) a vehicle;

(b) first and second platforms;

(c) a barrier engaged with the first and second platforms, the barrier and first and second platforms forming a protected work space; and (d) a caboose, wherein the vehicle and caboose are engaged with the first and second platforms, respectively, wherein the vehicle has a movable king pin plate engaged with a first king pin on the first platform, and wherein the caboose has a fixed king pin plate engaged with a second king pin on the second platform.

In a fifth embodiment, a safety system includes:

(a) a vehicle;

(b) first and second platforms;

(c) a barrier engaged with the first and second platforms, the barrier and first and second platforms forming a protected work space; and (d) a caboose, wherein the vehicle and caboose are engaged with the first and second platforms, respectively, wherein the vehicle and caboose have braking systems that operate independently.

In a sixth embodiment, a trailer includes:
(a) first and second platforms;
(b) a barrier engaged with the first and second platforms, the barrier and first and second platforms forming a protected work space, wherein the barrier is formed by a plurality of interconnected wall sections and wherein the interconnected wall sections slidably engage one another.

In a seventh embodiment, a trailer includes:
(a) first and second platforms;
(b) a barrier engaged with the first and second platforms, the barrier and first and second platforms forming a protected work space, wherein the barrier is formed by a plurality of interconnected wall sections and wherein the interconnected wall sections telescopically engage one another.

In an eighth embodiment, a trailer includes:
(a) first and second platforms;
(b) a barrier engaged with the first and second platforms, the barrier and first and second platforms forming a protected area, wherein the barrier is formed by a plurality of interconnected wall sections, and wherein at least one of the following is true:
(b1) a bottom of the barrier is positioned at a distance above a surface upon which the trailer is parked and wherein the distance ranges from about 10 to about 14 inches;
(b2) a height of the barrier above the surface is at least about 3.5 feet; and
(b3) a height of the barrier from a bottom of the barrier to the top of the barrier is at least about 2.5 feet.

The present invention can provide a number of advantages depending on the particular configuration.

In one aspect, the barrier (and thus the entire trailer) is of any selected length or extendable, but the wall is "fixed" to the platforms on one side of the trailer. That side, however, can be changed to the right or left side of the road, depending on the end to which the semi tractor attaches. This dual-ended, fixed-wall design thus can eliminate the need for complex shifting or rotating designs, which are inherently weaker and more expensive, and which cannot support the visual barriers, lighting, ventilation and other amenities necessary for providing a comprehensive safety solution. The directional lighting and impact-absorbing features incorporated at each end of the trailer and in the caboose can combine with the fixed wall and improved lighting to provide increased protection for both work crews and the public, especially with ever-increasing amounts of night-time construction. End platforms integral to the trailer's design can minimize the need for workers to leave the protected zone and eliminate the need for separate maintenance vehicles by providing onboard hydraulics, compressors, generators and related power, fuel, water, storage and portable restroom facilities. Optional overhead protection can be extended out over the work area for even greater environmental relief (rain or shine). The fixed wall itself can be made of any rigid material, such as steel. Lighter weight materials having high strength are typically disfavored as their reduced weight is less able to withstand, without significant displacement, the force of a vehicular collision. The trailer can carry independent directional and safety lighting at both ends and will work with any standard semi tractor. Optionally, an impact-absorbing caboose can be attached at the end of the trailer opposite the tractor to provide additional safety lighting and impact protection.

In one aspect, the trailer is designed to provide road maintenance personnel with improved protection from ongoing, oncoming and passing traffic, to reduce the ability of passing traffic to see inside the work area (to mitigate rubber-necking and secondary incidents), and to provide a fully-contained, mobile, enhanced environment within which the work crews can function day or night, complete with optional power, lighting, ventilation, heating, cooling, and overhead protection including extendable mesh shading for sun protection, or tarp covering for protection from rain, snow or other inclement weather.

Platforms can be provided at both ends of the trailer for hydraulics, compressors, generators and other equipment and supplies, including portable restroom facilities. The trailer can be fully rigged with direction and safety lighting, as well as lighting for the work area and platforms. Power outlets can be provided in the interior of the work area for use with construction tools and equipment, with minimal need for separate power trailers or extended cords. Both the caboose and the center underside of both end platforms can provide areas for fuel, water and storage. Additional fuel, water and miscellaneous storage space can be provided in an optional extended caboose of like but lengthened design.

In one aspect, the trailer is designed to eliminate the need for separate lighting trucks or trailers, to reduce glare to traffic, to eliminate the need for separate vehicles pulling portable restroom facilities, to provide better a brighter, more controlled work environment and enhanced safety, and to, among other things, better facilitate 24-hour construction along our nation's roadways. Other applications include but are not limited to public safety, portable shielding and shelter, communications and public works. Two or more trailers can be used together to provide a fully enclosed inner area, such as may be necessary in multi-lane freeway environments.

With significant shifts to night construction and maintenance, the trailer, in one aspect, can provide a well-lit, self-contained, and mobile safety enclosure. Historical cones can still be used to block lanes, and detection systems or personnel can be used to provide notice of an errant driver, but neither offers physical protection or more than split second warning for drivers who may be under the influence of alcohol or intoxicants, or who, for whatever reason, become fixated on the construction/maintenance equipment or lights and veer into or careen along the same.

The trailer can provide an increased level of physical protection both day and night and workers with a self-contained and enhanced work environment that provides them with basic amenities such as restrooms, water, power, lighting, ventilation and even some possible heating/cooling and shelter. The trailer can also be designed to keep passing motorists from seeing what is going on within the work area and hopefully facilitate better attention to what is going on in front of them. Hopefully, this will reduce both direct and secondary incidents along such construction and maintenance sites.

Embodiments of this invention can provide a safety trailer with semi-tractor hookups at both ends and a safety wall that is fixed to one side of the trailer. That side, however, can be changed to the right or left side of the road, depending on the end to which the semi-tractor attaches. A caboose can be attached at the end of the trailer opposite the tractor to provide additional lighting and impact protection. Optionally, the trailer can be equipped with overhead protection, lighting, ventilation, onboard hydraulics, compressors, generators and other equipment, as well as related fuel, water, storage and restroom facilities and other amenities.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

FIGS. 1A-1E show a loaded trailer, in accordance with embodiments of the present invention;

FIGS. 2A-2C show a deployed protective wall, in accordance with embodiments of the present invention;

FIGS. 3A-3C show a wall section in accordance with embodiments of the present invention;

FIGS. 4A-4H show a platform and its components in accordance with embodiments of the present invention;

FIGS. 5A-5B show a caboose, in accordance with embodiments of the present invention;

FIGS. 6A-6G show a truck mounted attenuator attached to the caboose shown in FIGS. 5A-5B;

FIG. 7 shows an interconnection member between a platform and a truck mounted attenuator;

DETAILED DESCRIPTION

Embodiments of the present invention are directed to a mobile traffic barrier. In one embodiment, the mobile traffic barrier includes a number of inter-connectable wall sections that can be loaded onto a truck bed. The truck bed itself includes two (first and second) platforms. Each platform includes a king pin (not shown); the king pin providing a connection between the selected platform and either a caboose or a tractor. By enabling the tractor to hook at either end, the trailer can incorporate a rigid fixed wall that is open to the right or left side of the road, depending on the end to which the tractor is connected. The side wall and the ends of the trailer define a protected work area for road maintenance and other operations. The tractor and caboose may exchange trailer ends to change the side to which the wall faces. The dual-hookup, fixed-wall design can enable and incorporate compartments (in the platforms) for equipment and storage, onboard power for lighting, ventilation, and heating and/or cooling devices and power tools, and on-board hydraulics for hydraulic tools. The design can also provide for relatively high shielding from driver views, and in general, a larger and better work environment, day or night.

Figure 1A:
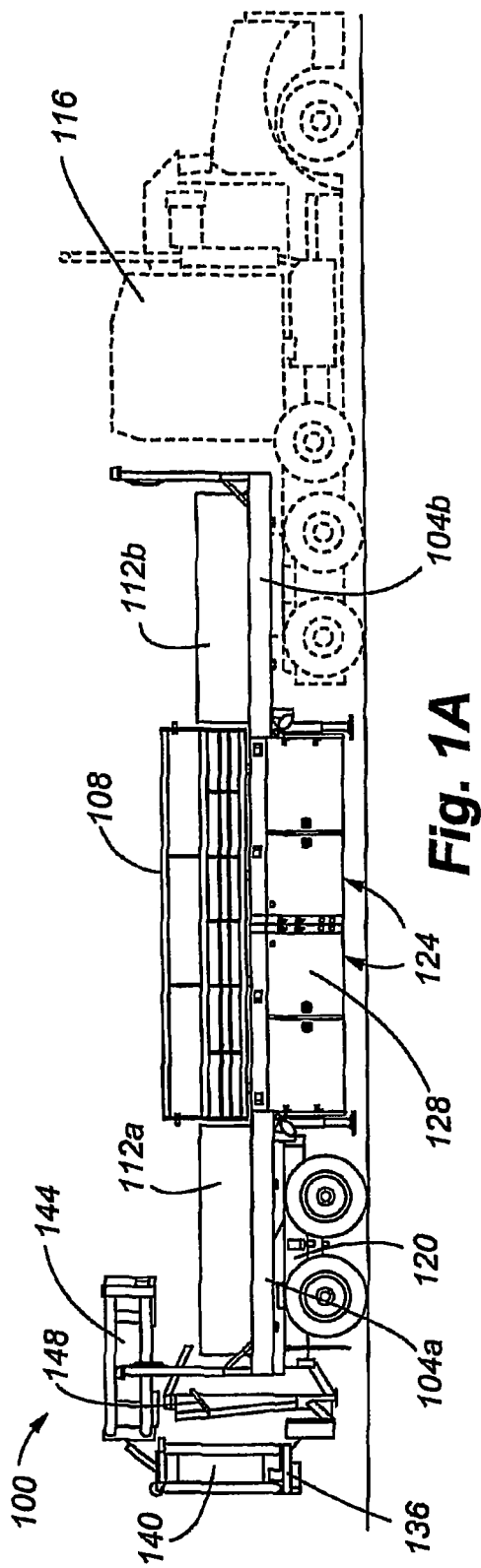

Referring initially to FIG. 1A, a trailer in accordance with an embodiment is generally identified with reference numeral 100. The trailer 100 includes two (first and second) platforms 104a,b and a number of wall sections 108a-c. As described in greater detail below, the wall sections 108a-c are adapted to interconnect to each other and to the platforms 104a,b to form a protective wall. In FIG. 1A, the wall sections 108a,b are disconnected from each other and secured in a stored position on top of the interconnected platforms 104a,b. In this position, the trailer 100 is configured so that it may be transported to a work site. In the transport configuration illustrated in FIG. 1A, the platforms 104 are bolted to each other to form a truck bed that is operable to carry the wall sections 108 and other components.

In addition to the wall sections 108a-c, the platforms 104a,b carry two rectangular shaped ballast members 112a,b, which are shown as boxes of sand. As will be appreciated, the ballast members can be any other heavy material. The weights of ballast boxes 112a,b counter balance the weights of the wall sections 108a-c, when the wall sections 108a-c are deployed to form a protective barrier and when being transported atop the platforms. The ballast boxes 112a,b hold between about 5,000 and 8,000 lbs. of weight, particularly sand. At 8,000 lbs., the ballast boxes 112a,b counter balance three wall sections 108a-c, when the wall sections are deployed or being transported. In one configuration, the wall sections 108a-c weigh approximately 5,000 lbs. each.

The truck bed formed by the interconnected platforms 108a,b is connected at one end to a standard semi-tractor 116 and at the other end to an impact-absorbing caboose 120. Both of the platforms 108a,b include a standard king pin connection to the tractor 116 or caboose 120, as the case may be. The caboose 120 may include an impact absorbing Track Mounted Attenuator ("TMA") 136, such as the SCORPION™ manufactured by TrafFix Devices, Inc. In accordance with alternative embodiments, the caboose 120 and/or tractor 116 may include a rigid connection to the rear platform 104.

Figure 1B:
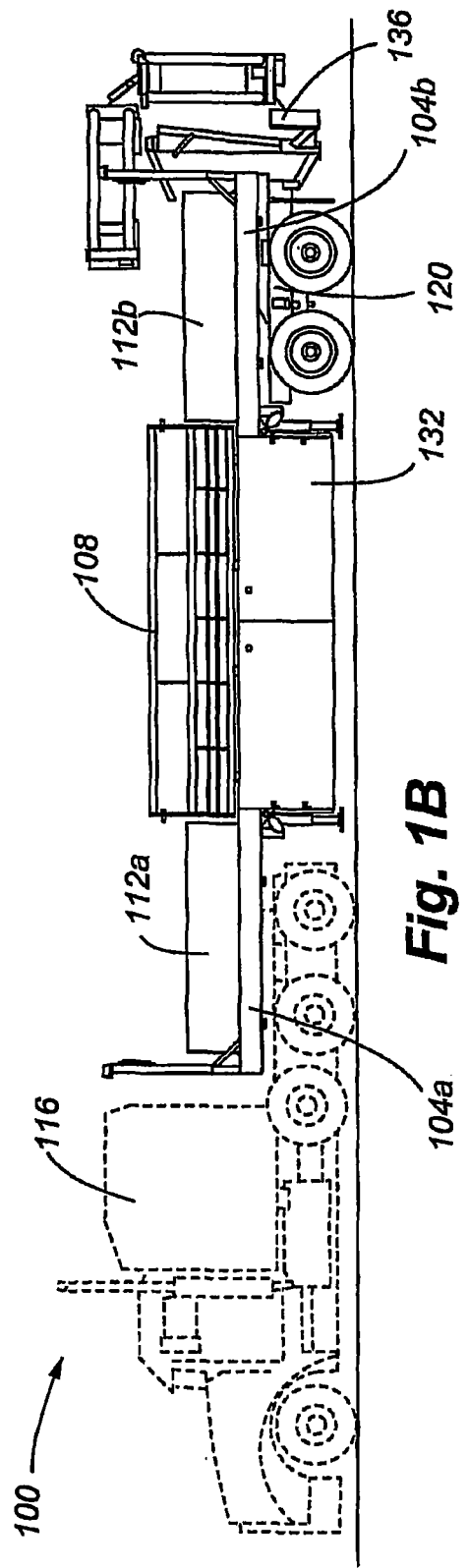

FIG. 1B shows a reverse side of the trailer 100 shown in FIG. 1A. Each platform 104a,b includes at least one storage compartment 124. The doors 128 to the storage compartment 124 are shown in FIG. 1A. The reverse perspective of FIG. 1B shows a rigid wall 132 forming the rear of the storage compartment 124.

FIG. 1C shows a rear view of the trailer 100. In FIG. 1C, the TMA 136 is shown in its retracted position. FIG. 1D shows a rear view of the trailer 100 with the TMA 136 in a deployed position.

FIG. 1E shows a top plan view of the trailer 100. As can also be seen in FIGS. 1D and 1E, the trailer 100 includes three wall sections 108 stored on top of the platforms 104a,b. Two of the wall sections 108a,b nearest the right side of the trailer are positioned end-to-end, with one being positioned on top of each platform. The third wall section 108c is positioned between the wall sections 108a,b and the ballast boxes 112 and is approximately bisected by the longitudinal axis A of the trailer (or the first and second platforms). Effectively, by substantially co-locating the longitudinal axis of the third wall section 108c with the longitudinal axis A of the trailer, the weight of the third wall section 108c is effectively counter-balanced. The weight of ballast box 112a therefore counterbalances effectively the first wall section 104a and ballast box 112b counterbalances effectively the second wall section 104b. The platforms 104a,b are asymmetrical with respect to the longitudinal axis A. Accordingly, the weights of the ballast boxes can be greater than the weights of the wall sections to counter balanced the asymmetrical portion of the platforms. The loading of the trailer shown in FIG. 1E thus serves to balance the weight of the various trailer components with respect to the longitudinal axis A.

Referring now to FIG. 2A, the trailer 100 is shown in its unloaded or deployed configuration. As can be seen in FIG. 2A, the wall sections 108a-c have been removed from their loaded positions on top of the platforms 104a,b and connected between the platforms 104a,b to form a protective barrier 200. This is accomplished by removing the wall sections 108a-c, such as for example through the use of cranes or a forklift, and then disconnecting the two platforms 104a,b from each other. After the platforms 104a,b have been disconnected, the platforms 104a,b are spatially separated and the wall sections 108a-c are then inserted there-between. As can be seen in FIG. 2A, the two ballast boxes 112a,b remain in place on top of the platforms 104a,b. The ballast boxes provide a counter-balance to the weight of the wall sections 108a-c, which are disposed on the opposite side of the platforms 104a,b.

FIG. 2A shows a view of the protective barrier 200 from the perspective of the protected work zone area. From the protected work zone, the storage compartment doors 128 and other equipment are accessible. The protected work zone area 204 can seen in FIG. 2B, which shows a top plan view of the protective barrier 200 shown in FIG. 2A. As can be seen, the protective barrier creates a protected work area 204, which includes a space adjacent to the wall sections 108a-c and between the platforms 104a,b. The road or other work surface is exposed within the work zone area 204. The work zone area 204 is sufficiently large for heavy equipment to access the work surface.

FIG. 2C shows the traffic-facing side of the protective barrier 200. As can be seen in FIG. 2C, the protective barrier 200 presents a protective wall 208 proximate to the traffic zone. The protective wall 208 includes the rigid wall 132 and number of wall sections 108a-c, which are interconnected to the two platforms 104a,b. The bottoms of the wall sections 108a-c are elevated a distance 280 above the roadway 284. FIGS. 5A-B additionally show a portion of the caboose 120, which interconnects to and is disposed underneath a selected one of the platforms 104a,b. The wheels of the caboose 120, in the deployed position of the trailer 100 shown in FIG. 2C, are covered with a piece of sheet metal 212. During transport, this piece of sheet metal 212 can be disconnected from the platform 104 and positioned in a stowed manner on top of one of the platforms 104.

Although stands 290 are shown in place at either end of the protective barrier 200 and may be used to support individual wall sections 108 of the barrier 200, it is to be understood that no stands are required to support the barrier 200. The barrier 200 has sufficient structural rigidity to act as a self-supporting elongated beam when supported on either end by the tractor 116 and caboose 120. This ability permits the barrier 200 to be located simply by locking the tractor and caboose brakes and relocated simply by unlocking the brakes, moving the barrier 200 to the desired location, and relocking the brakes of the tractor and caboose. Requiring additional supports or stands to be lowered as part of barrier 200 deployment can not only immobilize the barrier 200 but also increase barrier rigidity to the point where it may cause excess damage and deflection to a colliding vehicle and excess ride down and lateral G forces to the occupant of the vehicle.

The wall section height is preferably sufficient to prevent a vehicle colliding with the barrier 200 from flipping over the wall section into the work area and/or the barrier 200 from cutting into the colliding vehicle, thereby increasing vehicle damage and lateral and ride-down G forces to vehicular occupants. Preferably, the height of each of the wall sections is at least about 2.5 feet, more preferably at least about 3.0 feet, even more preferably at least about 3.5 feet, and even more preferably at least about 4.0 feet. Preferably, the height of the top of each wall section above the surface of the ground or pavement 284 is at least about 3.5 feet, more preferably at least about 4 feet, even more preferably at least about 4.5 feet, and even more preferably at least about 5 feet.

The protective wall or barrier 200 may additionally include attachment members 216 operable to interconnect a visual barrier 220 to the protective wall 200. A visual barrier 220 in accordance with embodiments is mounted to the protective wall 200 and extends from the top of the protective wall 200 to approximately four feet above the wall 200. The visual barrier 220 is interconnected to attachment members 216, such as poles, which are interconnected to the wall 200. In accordance with an embodiment, the attachment members 216 comprise poles which extend 10 feet upwardly from the wall section 200. Each pole may support a 6 lb. light head at the top which generates over 3,000 alums of light. The poles may additionally provide an attachment means for the visual barrier 220. While attached to the poles, the visual barrier 220 extends approximately 4 feet upwardly from the protective wall 200.

The visual barrier 220 provides an additional safety factor for the work zone 204. Studies have shown that a major cause of highway traffic accidents in and around work zone areas is the tendency for drivers to "rubber-neck" or look into the work zone from a moving vehicle. In this regard, it is found that such behavior can lead to traffic accidents. In particular, the "rubber-necking" driver may veer out of his or her traffic lane and into the work zone, resulting in a work zone incursion. The present invention can provide a structurally rigid wall 200 that prevents incursion into the work zone 204, as well as a visual barrier 220 which discourages this, so called, "rubber necking" behavior.

Studies have indicated that people are drawn to lights and distractions, and that they tend to steer and drive into what they are looking at. This is particularly hazardous for construction workers, especially where cones and other temporary barriers are being deployed on maintenance projects. Studies also indicate that lighting and equipment movement within a work zone are important factors in work site safety. Significant numbers of people are injured not only from errant vehicles entering the work zone, but also simply by movement of equipment within the work area. The trailer can be designed not only to keep passing traffic out of the work area, but also to reduce the amount of vehicles and equipment otherwise moving around within the work area.

In terms of lighting, research indicates more is better. Current lighting is often somewhat removed from the location where the work is actually taking place. Often, the lighting banks are on separate carts which themselves contribute to equipment traffic, congestion and accidents within the job site.

These competing considerations of motorists, at night, steering towards lights and roadside workmen being safer at night with more lighting can be satisfied by the trailer. The trailer can use the light heads 270 to provide substantial lighting where it is needed. If the work moves, the lighting moves with the work area, rather than the work area moving away from the lighting. Most importantly, the safety barrier—front, back and side—can move along too, providing simple but effective physical and visual barriers to passing traffic. Referring to FIGS. 2B and 2C, the light heads 270 positioned along the barrier 200 have a direction of illumination that is approximately perpendicular or normal to the direction of oncoming traffic. This configuration provides not only less glare to oncoming motorists but also less temptation for motorists to steer towards and into the barrier 200.

FIGS. 2A-2C show the protective barrier 200 deployed for use in connection with a work-zone area. The design of the support members and the traffic facing portion of the protective barrier 200, serve to provide a safe means for mitigating the effects of such a collision. In particular, the barrier 200 can re-direct the impacted moving car down the length of the protective wall 208. Here, the moving car is not reflected back into traffic. Further incidents are prevented by not reflecting the moving car back from the mobile barrier into other cars, thereby enhancing safety not only of the driver of the vehicle colliding with the barrier but also of other drivers in the vicinity of the incident. The inherent rock/roll movement in the tractor 116 and trailer (caboose) springs and shocks assist dissipation of shock from vehicular impact. In addition, by deflecting the moving vehicle down the length of the protective wall 208, the work zone 200 is prevented from sustaining an incursion by the moving vehicle, thereby enhancing safety of workers.

A number of factors are potentially important in maintaining this desirable effect. Firstly, the protective barrier 204 is maintained in a substantially vertical position. This is accomplished through a ballasting system and method in accordance with an embodiment. In particular, the wall sections 108 are balanced in a first step with the ballast boxes 112. In a following step, a more precise balancing of the protective barrier 200 position is achieved through a system of movable pistons associated with the caboose 120. This aspect of the invention is described in greater detail below. Second, the structural design of the wall sections 108 serve to provide optimal deflection of an incoming car. Finally as shown in FIG. 2B, the protective wall or barrier 200 is substantially planar and smooth (and substantially free of projections) along its length to provide a relatively low coefficient of friction to an oncoming vehicle. As will be appreciated, projections can redirect the vehicle into the wall and interfere with the wall's ability to direct the vehicle in a direction substantially parallel to the wall.

Figure 3B:
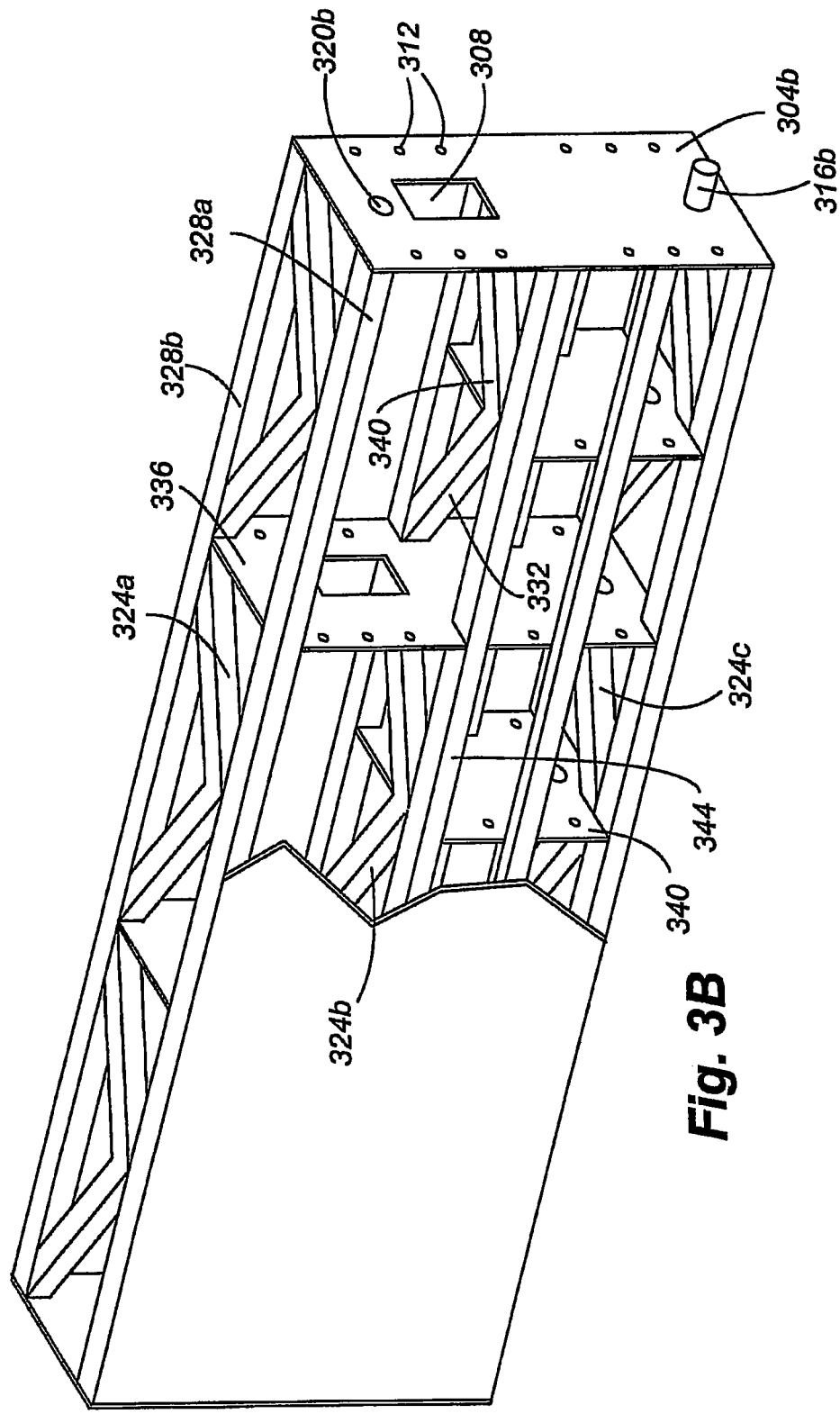

Turning now to FIG. 3A, an individual wall section 108 is shown in perspective view from the traffic side of the wall section 108. As can be seen in FIG. 3A, the wall section 108 includes a wall skin portion 300, which faces the traffic side of the protective barrier 200 and is smooth to provide a relatively low coefficient of friction to a colliding vehicle. The wall skin 300 is adapted to distribute the force of the impact along a broad surface, thereby absorbing substantially the impact. As additionally can be seen in FIG. 3A, the wall section 108 includes a first end portion or wall end member 304*a*. The first end portion 304*a* includes a conduit box 308, a number of bolt holes 312, a protruding alignment member, which is shown as a large dowel 316*a*, and an alignment receiving member, which is shown as a small dowel receiver hole 320*a*. As will be appreciated, the alignment member can have any shape or length, depending on the application. The first end portion 304*a* of the wall section 108 is adapted to be interconnected to a second end portion 304*b* of an adjacent wall section 108 or platform 104. A second end portion 304*b* can be seen in FIG. 3B, which shows the opposite end 304*b* of the wall section 108 shown in FIG. 3A, including a protruding small dowel 316*b* and a large dowel receiver hole 320*b*. For each wall section 108, the large dowel 316*a* disposed on the top of the first end portion 304*a* is operatively associated with a large dowel receiver hole 320*b* in the second end portion 304*b* of an adjacent wall section 108 or platform 104. Similarly, the small dowel 316*b* on the second end portion 304*b* is operatively associated with the small dowel receiver hole 320*a* in the first end portion 304*a* of an adjacent wall section 108 or platform 104. Additionally, the wall sections 108 are interconnected through a screw-and-bolt connection using the bolt holes 312 associated with the wall ends 304. The conduit box 308 is additionally aligned with an adjacent conduit box 308, providing a means for allowing entry and pass-through of such components as electrical lines, air hoses, hydraulic lines, and the like.

Figure 3C:
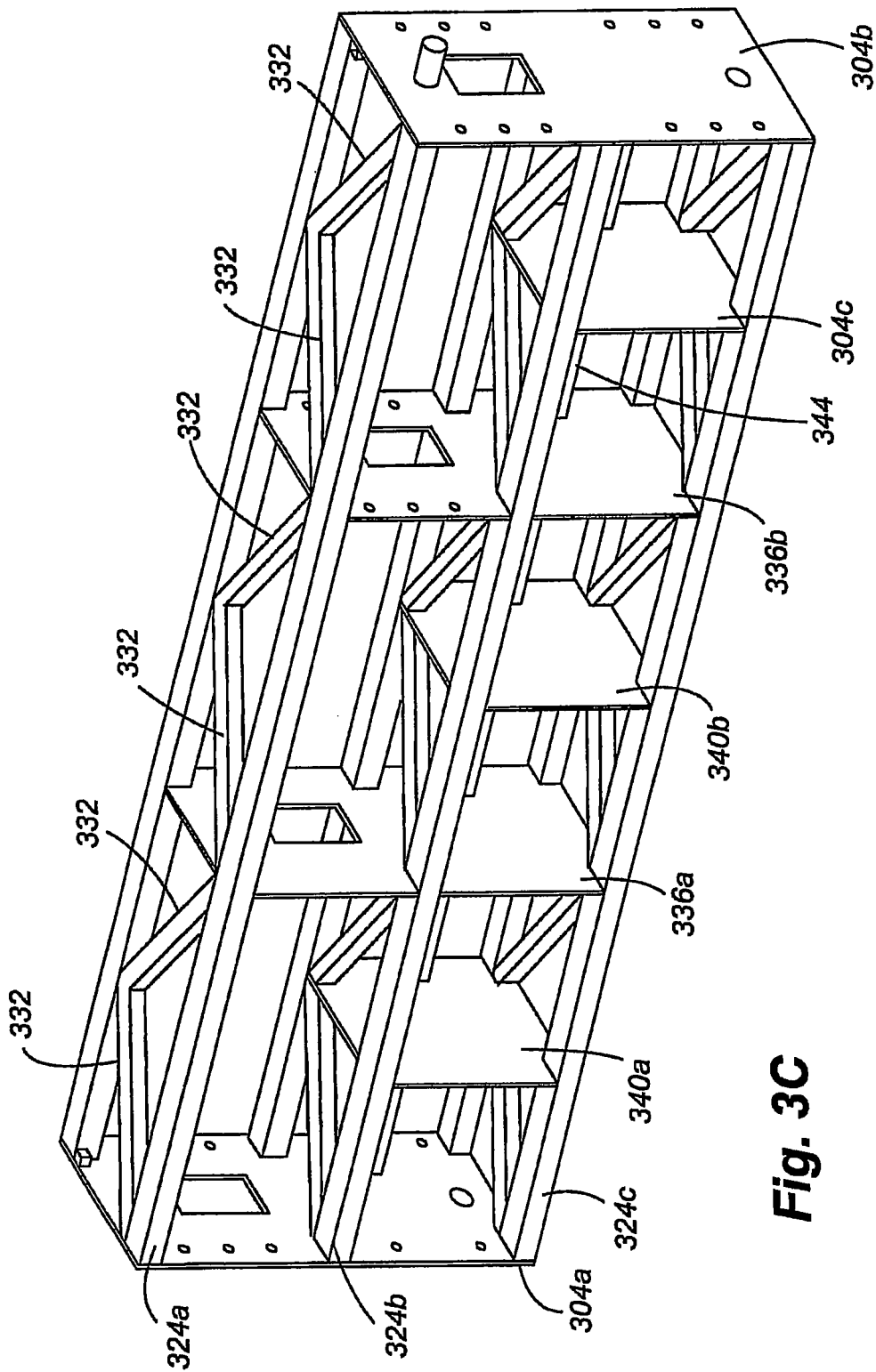

In FIG. 3B, a portion of the wall skin 300 is not shown in order to reveal the interior of the wall section 108. As can be appreciated, such a partial wall skin 300 is shown here for illustrative purposes. As can be seen in FIGS. 3B and 3C, the wall section 108 includes three bracing sections 324*a-c* vertically spaced equidistant from one another. Each of the bracing sections 324 includes two opposing horizontal beams 328*a-b*, with the free ends being connected to the adjacent wall end member 304*a,b*. The two horizontal beams 328*a-b* are interconnected with angled steel members 332 to form a truss-like structure. The wall section 108 includes three bracing sections: the first bracing section 324*a* being at the top, the second bracing section 324*b* being at the middle and the third bracing section 324*c* being at the bottom. Additionally, the wall section 108 includes a number of full-height vertical wall sections 336*a,b*, the wall end members 304*a,b*, and a number of partial-height vertical wall sections 340*a-c*. As shown in FIG. 3A, the full-height wall sections 336*a,b* and partial-height wall sections 340*a-c* alternate. Additionally, it can be seen that the angled steel members 332 intersect at points where the partial-height wall 340 or full height wall 336 section, as the case may be, meets the horizontal beam 328*a,b*, which, on one side, faces the traffic side of the wall section 108. Additionally, the wall section includes a fourth horizontal member 344. Unlike the structural members 328 and 336 which are preferably configured as rectangular steel beams, this fourth horizontal member 344 is configured as a steel C-channel beam. The C-channel is preferably positioned substantially at the height of a car or SUV bumper. In use, the bottom of the wall section 108 sits approximately eleven inches off of the ground, and the fourth horizontal member 344 sits approximately twenty inches off of the ground.

The wall sections 108 constructed as described and shown herein are specifically adapted to prevent gouging of the wall as a result of an impact from a moving car. In particular, gouging as used herein refers to piercing or tearing or otherwise drastic deformation of the wall section, which results in transfer of energy from a moving car into the mobile barrier 200. As described herein, by deflecting the car down the length of the protective wall 200, a desirable amount of energy is absorbed by the wall and therefore not transferred to other portions of the protective wall 200. It is additionally noted that the floating king pin plate of the standard trailer 116 provides a shock absorbing effect for impacts which are received by the protective wall 200. The shock absorbing effect of the trailer's 116 floating king pin plate 500 is complemented by fixed king pin plate associated with the caboose 120 (which is discussed below).

In accordance with an embodiment, the dimensions of the various trailer and wall components vary. By way of example, the length of each wall section 108 preferably ranges from about 10 to 30 feet in length, more preferably from about 15 to 25 feet in length, and more preferably from about 18 to 22 feet in length. The width of each of the wall sections preferably ranges from about 18 to 30 inches, more preferably from about 22 to 28 inches, and more preferably from about 23 to 25 inches. The height of each of the wall sections 108 preferably ranges from about 3 to 4.5 feet, more preferably from about 3.75 to 4.25 feet, and more preferably from about 3.9 to 4.1 feet. It should be noted that these height ranges and distances measure from the base of a wall section 108 to the top of the wall section 108 and do not include the wall section's height when it is displaced with respect to the ground. In use, the wall section 108 typically is disposed at a predetermined distance from the ground. In particular, this distance preferably ranges from about 10 to 14 inches, more preferably from about 11 to 13 inches, and more preferably from about 11.5 to 12.5 inches. In accordance with an embodiment, a wall section is approximately 20 feet long, 24 inches wide, 4 feet high as measured from the base of the wall section to the top of the wall section and, when deployed, disposed at a distance of 12 inches from the ground.

The beams 328a and 328b span the length of the entire wall section. In accordance with an embodiment, the horizontal beams 328a and 328b measure from about 3-5 inches by about 5-7 inches, more preferably from about 3.5 inches to 4.5 inches by 5.5 inches to 6.5 inches, and even more preferably are about 4 inches by 6 inches. In accordance with an embodiment, the longer dimension of the beam is disposed in the horizontal direction. For example, with 4.times.6 beams, the 4-inch dimension is disposed in the vertical direction and the 6-inch dimension is in the horizontal direction. In this embodiment with three sets of horizontal beams, the bottom and middle beams are separated by about 18 inches and the middle and the top beams also by about 18 inches. In this configuration, the total height of the wall section is 4 feet. In other portions of the mobile barrier 200, the orientations of the horizontal beams may differ. In particular, the longer 6 inch dimension may be in the vertical direction, and the shorter 4 inch dimension may be in the horizontal direction. In accordance with an embodiment, this orientation for the horizontal beams is implemented in connection with the platforms 104.

The wall skin 300 may be comprised of a single homogeneous piece of steel that is welded to the wall section 108. The wall skin 300 is preferably between about 0.1 and 0.5 inch thick, more preferably between about 0.2 and 0.4 inch, and even more preferably approximately 0.25 inches thick. These dimensions are also applicable to the partial-height and full height wall members 340, 336. The wall end portions or plates 304b and 304a are preferably between about 0.25 and 1.25 inch thick, more preferably between about 0.5 and 1 inch thick, and even more preferably are about 0.75 inch thick.

In accordance with a preferred embodiment where the wall sections 108 are approximately 20 feet in length, a work space area 204 is defined when these wall sections are deployed that measures approximately 80 feet in length. In particular, the three wall sections total 60 feet in addition to 10 feet on each side of additional space provided by the interior portions of the platforms 104.

Referring again to FIG. 3C, a wall section 108 may include a number of attaching devices, which provide a means for interconnecting various auxiliary components to the wall section 108. In particular, a wall section 108 may include an attachment member mounting 348, operable to mount an attachment member 216, such as a pole. The attachment member mounting shown in FIG. 3C includes a lever which, through a quarter turn, is operable to lock the light pole in place. A pole may be used to mount a light in connection with using the wall barrier during night-time hours. As can be appreciated in such conditions, the work area will be required to be illuminated. Such illumination can be accomplished by light poles and corresponding lights which are mounted to the wall section. The light poles, lights and other auxiliary components may be stored in the storage compartments 124.

The wall section 108 additionally may include attachments for jack stands 352. The jack stands 352 provide a means for supporting the wall section 108 at the above-mentioned height of approximately eleven inches from the ground.

The wall section 108 may additionally include, so called, "glad hand boxes" (not shown), which provide means for accessing 12, 110, 120, 220, and/or 240 volt electricity. In accordance with the embodiments, the protective barrier 200 includes an electric generator and/or one or more batteries (which may be recharged by on-board solar panels) providing electricity which is accessible through the glad hand box and is additionally used in connection with other components of the protective barrier 200 described herein. The generator and/or the batteries may additionally be stored the storage compartments 124, and the batteries used to start the generator and support electronics when the generator is turned off or is not operational.

The wall section 108 may be comprised of, or formed from, any suitable material which provides strength and rigidity to the wall section 108. In accordance with embodiments, the beams of the wall section are made of steel and the outer skin of the wall section is made from sheets of steel. In accordance with alternative embodiments, the wall section 108 is made from carbon fiber composite material.

Figure 4A:
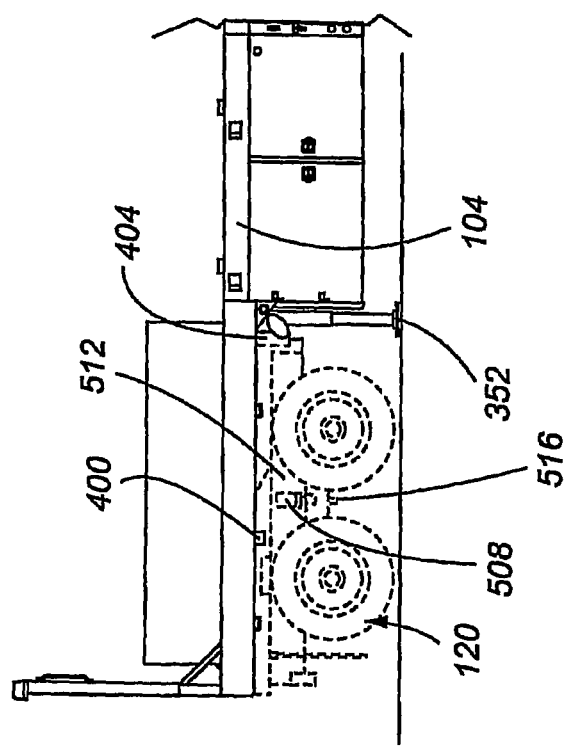

Referring now to FIG. 4A, a side perspective view of a platform 104 is shown. In FIG. 4A the platform is resting on a jack stand 352. Additionally, the outline of the caboose 120 is shown in FIG. 4A. With the caboose 120 attached, the platform 104 shown in FIG. 4A would correspond to the rear of the protective barrier 200 and/or the rear of the loaded trailer 100. As can be seen in FIG. 4A, the platform includes a king pin 400. The king pin 400 provides an interconnection between the platform 104 and the caboose 120. The king pin 400 is disposed on the underside of the platform 104 in a position that allows the king pin 400 to connect with a standard floating king pin plate associated with a semi-tractor 116 or a fixed king pin plate associated with the caboose 120. In this way, either the caboose 120 or the semi-tractor 116 may be connected to the platform 104 using the king pin 400. A nose receiver 404 portion of the platform 104 provides a means for receiving the end, or nose portion of the caboose 120. This aspect of the invention is described in greater detail below.

Figure 4F:
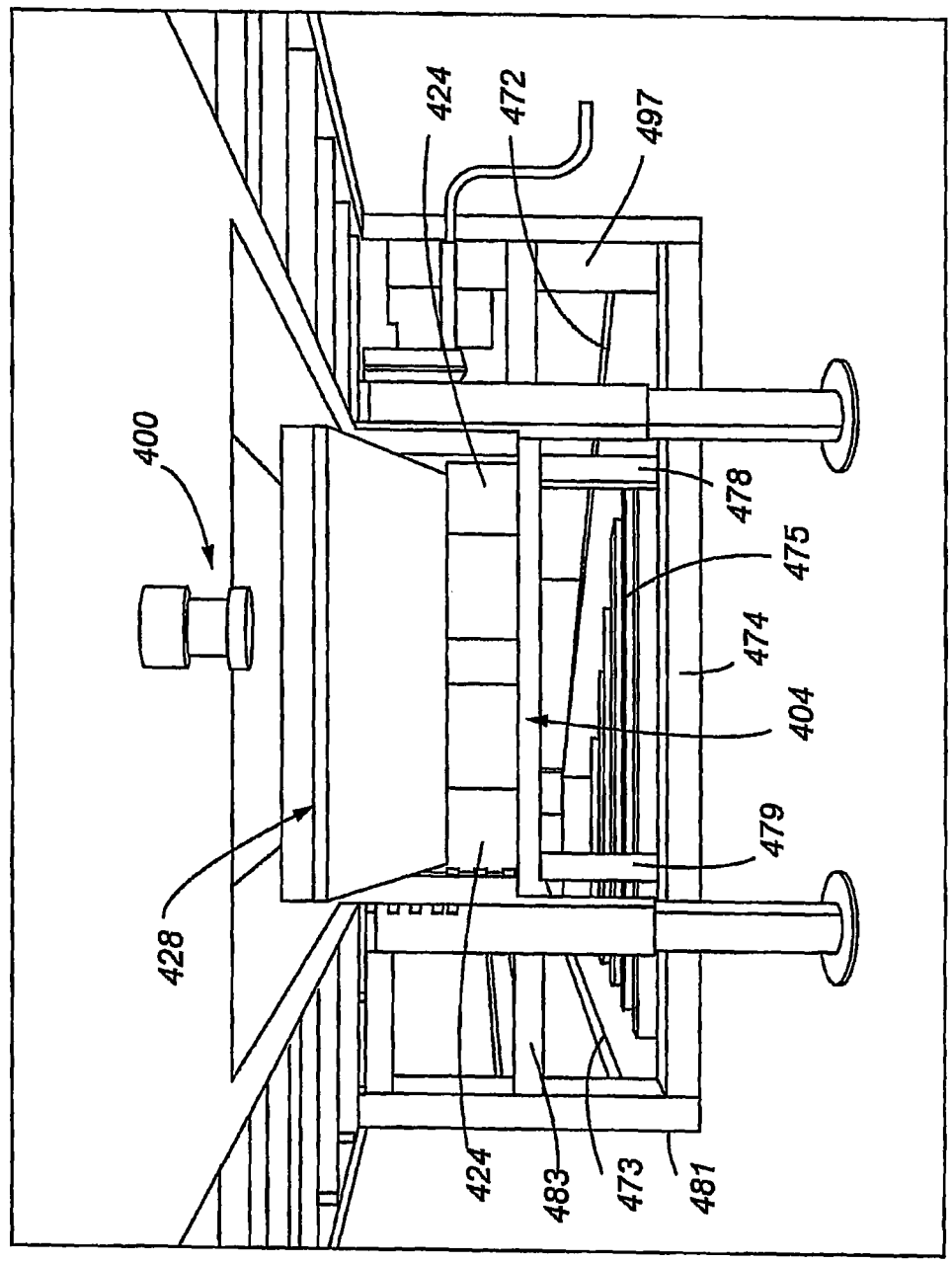
Figure 4G:
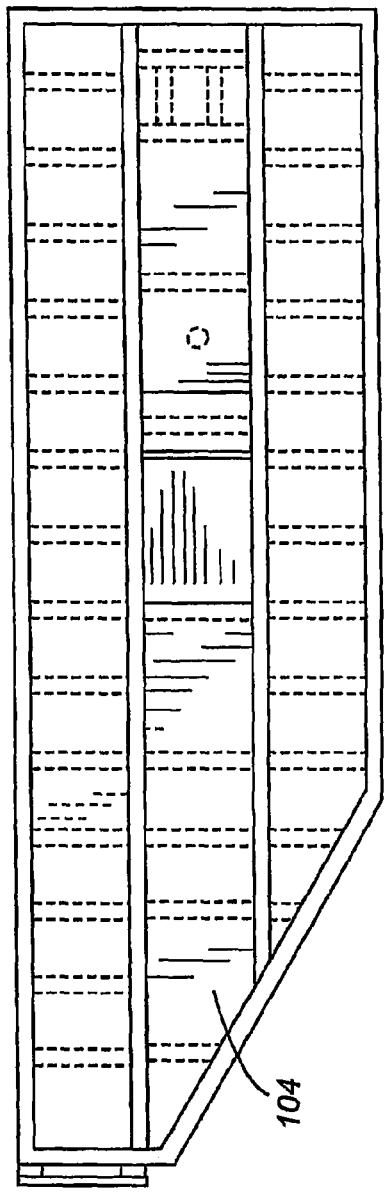

In FIG. 4B and FIG. 4C, two opposed platforms 104 are shown with a central external cover plate of the central portions of the platforms being removed to show the structural members while the ballast box external support plates are in position, in FIG. 4D, a platform is shown with all exterior cover plates removed, and in FIG. 4G a platform is shown with all external cover plates in position. As can be seen, the first end 408 of the platform 104 is wider than the second end 412 of the platform 104. Here, the platform 104 includes support members 421 for supporting the king pin (not shown), a sloping plate 428 for receiving the nose portion of the caboose, a flat plate assembly 422 positioned above and supporting the jack stands 423, and a sloped or narrowing section 416, which slopes from the larger, first-end 408 width, to the smaller, second-end 412 width. This sloped portion 416 of the platforms 104 includes the storage compartment 124. The two second-ends 412 of the platform 104 are adapted to be interconnected to each other. The two first-ends 408 of the platform 104 are adapted to interconnect to either the tractor 116 or the caboose 120, as described above. As can be seen in FIG. 4D, the platform 104 includes two side channels 420a-b. Typically, the channel 420a proximate to the work zone is adapted to receive a ballast box 112, both in the mobile and the deployed positions.

FIGS. 4D, 4E, and 4F further show the structural members of each of the platforms. The platforms are identically constructed but are mirror images of one another. The traffic-facing, or elongated, side 460 of the platform 104 includes upper, middle, and lower horizontal structural members 464, 468, and 472. The upper, middle, and lower horizontal structural members are at the same heights as and similar dimensions to the upper, middle, and lower horizontal beams 328, respectively. The members 464, 468, and 472, unlike the beams 328, are oriented with the long dimension vertical and the shorter dimension horizontal. By orienting the members differently from the beams, the need for a member similar to the fourth horizontal member 344 is obviated. The upper structural member 464 is part of an interconnected framework of interconnected members 476, 480, 484, 488, 490, and 492 defining the upper level of the platform. Lateral structural members 494 provide structural support for the ballast boxes, depending on where they are positioned, and lateral members 496 provide further structural support for the upper level and for the king pin and other caboose interconnecting features discussed below. The first end of the lower structural member attaches to a corner member 497 and second ends of the upper and lower structural members to the second end member 498. At the level of the lower structural member 472, lower structural members 473, 474, 475, and 477 define the lower level of the platform. Additional vertical and corner members 478, 479, and 481 attach the lower and upper levels of the platform and horizontal support member 483 interconnects corner members 497 and 481 and vertical members 478 and 479. The lower level further includes lateral members 475 and elongated member 477 to provide further structural support for the lower level and provide support for the bottom of the storage compartment.

Figure 4H:
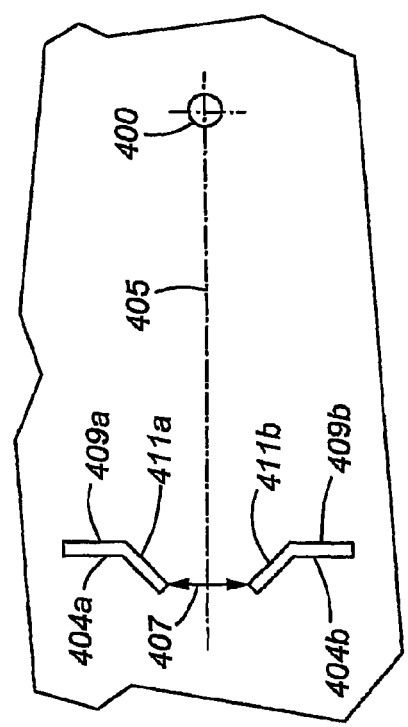

In FIGS. 4G and 4H, portions of the platform 104 are shown, which include the underside of a platform 104. As can be seen in FIG. 4E, the platform 104 includes a king pin 400 disposed substantially in alignment with a longitudinal axis 405 bisecting a space 407 defined by the nose receiver portion 404. The nose receiver portion 404 includes two angled components 424a,b as well as a downwardly facing deflection plate 428. FIG. 4H shows, in plan view, the components 424a,b, each of which includes a straight portion 409a,b and angled portion 411a,b. The space 407 between the angled portions is in substantial alignment with the king pin 400.

As the caboose 120 is backed into the space underneath the platform 104, the king pin 400 is received in a king pin receiver channel 524 (FIG. 5) in a fixed king pin plate on the caboose 120, and the nose of the caboose is received in the nose receiver 404 portion of the platform 104. The nose receiver portion 404, namely the angled portions of the components 424a,b and sloped deflection plate 428, guide the an angled front-nose portion 520 (FIG. 5) of the caboose as the caboose is brought into position underneath the platform 104 to align the king pin with the king pin receiver channel 524 (FIG. 5). In particular, the two angled components 424 operate to provide lateral guidance for the position of the caboose 120. Here, the two angled components 424 ensure that the king pin 400 is received in the king pin receiver channel 524 associated with the caboose 120. The downwardly facing deflection plate 428 exerts a downward force on the nose 520 of the caboose that results in the rear of the caboose 120 raising up to engage the rear of the platform 104. The interconnection between the caboose 120 and the rear of the platform 104 is described in greater detail below.

In FIG. 5A, a side perspective view of the caboose 120 is shown. As shown in FIG. 5A, the caboose 120 includes the fixed king pin plate 500. The king pin plate 500 includes a king pin receiver channel 524 provided at the end of the plate 500. This pin receiver channel 524 is adapted to receive the king pin 400 and provides a locking mechanism for locking the caboose 120 to the end of the platform 104. In addition, the caboose 104 includes a vertical adjustment member, which is shown as movable pneumatically or hydraulically actuated piston 508 (as can be seen in FIG. 4A), disposed on each side between the two wheels of the caboose 120. Although a piston is shown, it is to be understood that any suitable adjustment member may be used, such as a mechanical lifting device (e.g., a jack or crank). The movable piston 508 is associated with a piston cylinder and is interconnected to a top 512 portion and a bottom portion 516 of the caboose 120. The bottom portion 516 provides a mounting for the wheel axles as well as the wheel suspension. The movable piston 508, as described in greater detail below, is operable to be inflated, thereby adjusting the height of the selected, adjacent side of mobile barrier 200. More specifically, the movable piston 508 moves the caboose 120 off of its suspension or leaf springs.

In FIG. 5A, a side perspective view of the caboose 120 is shown. As can be seen in FIG. 5B, the fixed king pin plate 500 includes the king pin receiver channel 524. The king pin receiver channel 524 includes a front, wide portion 528, which leads into a rear, narrow portion 532, as this king pin receiver channel 524 allows the caboose 120 to be positioned properly while the caboose is being backed into and underneath the platform 104. In this regard, the nose 520 of the caboose 120 is additionally received in the nose receiver portion 404, disposed on the underside of the platform 104. This aspect of the present invention is described in greater detail below.

Referring now to FIG. 58, an additional side perspective view of the caboose 120 is shown. In FIG. 5B, the king pin plate 500 is shown removed from the caboose 120. As can be seen in FIG. 5B, underneath the king pin plate 500, the caboose 120 includes a number of air cylinders 536. These air cylinders 536 are associated with a standard ABS braking system and operate independently of the braking system of the tractor 116. As described in greater detail below, the air cylinders 536 can be locked by an auxiliary mechanism associated with the caboose 120 to hold the caboose 120 in place. The auxiliary mechanism may be adjusted to allow the brakes to be engaged and the caboose 120 held in place even if the caboose 120 is disconnected from the platform 104. This mechanism additionally provides a means for inflating and deflating the movable piston 508 disposed on either side of the caboose 120.

Figure 8:
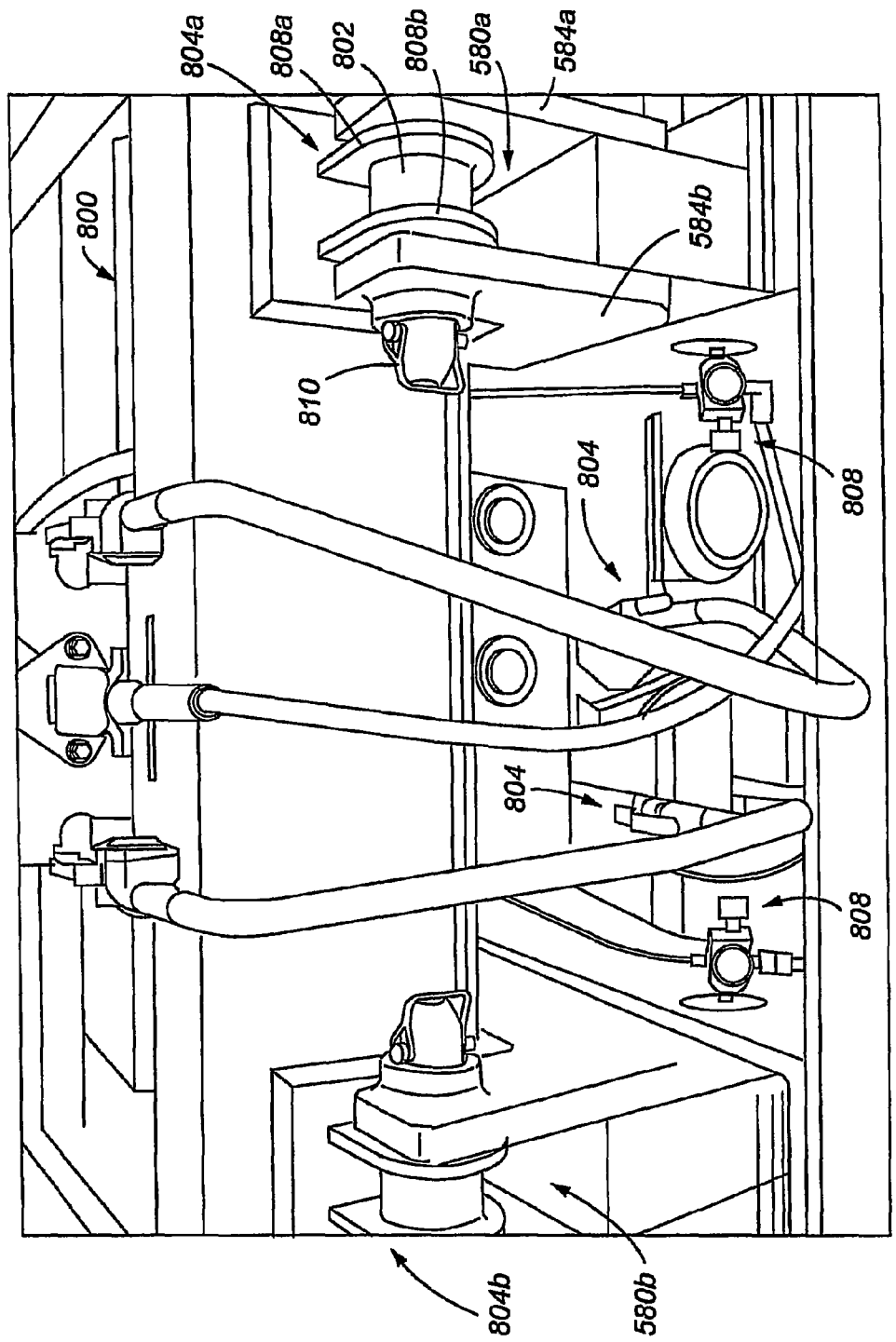
FIG. 8 shows a forced air system, in accordance with embodiments of the present invention.

FIGS. 5A, 5B, and 8 depict the removable attachment mechanism between the caboose and the platform. The caboose includes permanently attached first and second pairs 580a,b of opposing attachment members 584a,b. Each attachment member 584a,b in the pair 580a,b has matching and aligned holes extending through each attachment member. In FIG. 8, first and second pairs 804a,b of attachment members 808a,b are permanently attached to the platform. Each attachment member 808a,b in the pair includes matching and aligned holes extending through the attachment member 808. When the caboose is in proper position relative to the platform, the holes in the attachment members 584a,b and 808a,b are aligned and removably receive a pin 802 having a cotter pin or key 810 to lock the dowell 802 in position in the aligned holes of each set of engaged pairs of attachment members 580 and 804.

An embodiment includes a truck mounted crash attenuator, or equivalently, a Truck Mounted Attenuator (TMA). Referring again to FIG. 1A, a truck mounted attenuator 136 is shown interconnected to the trailer 100 at the caboose 120. In FIG. 1A, the truck mounted attenuator 136 is shown in a retracted position. The truck mounted attenuator 136 includes a first portion 140 and a second portion 144. In the retracted position, the first portion 140 is positioned substantially vertically and supports the weight of the second portion 144, which is held in a substantially horizontal position over the caboose 120. A movable electronic billboard 148 and light bar 150 (which can provide a selected message to oncoming traffic) is located underneath the second portion 144 of the truck mounted attenuator 136.

Figure 6D:
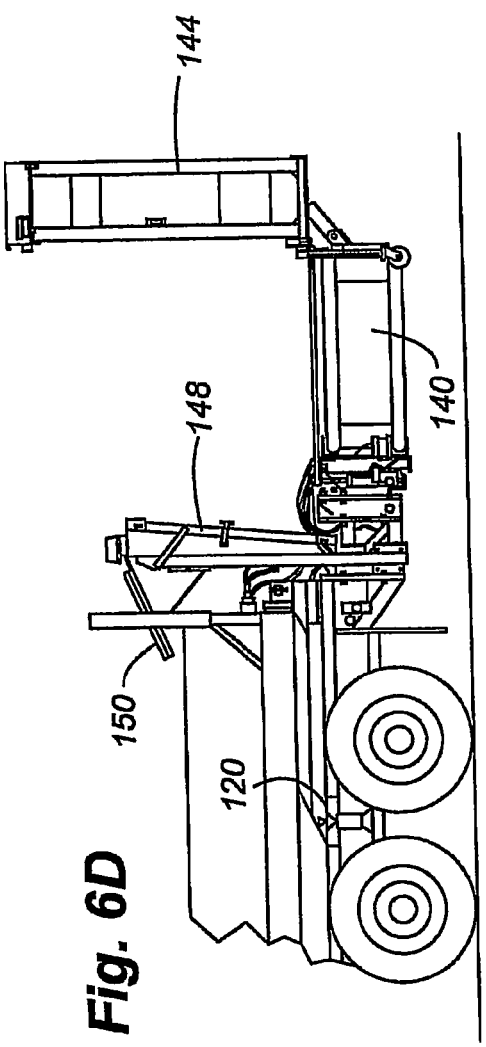
Figure 6E:
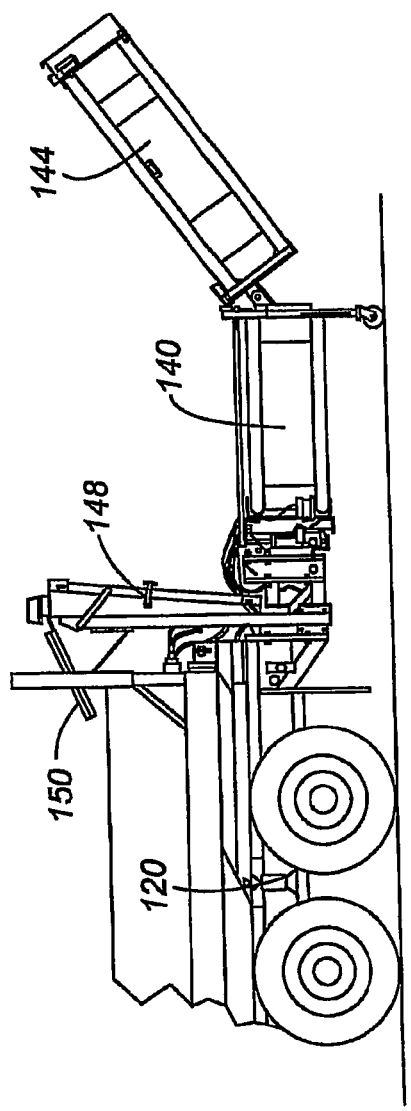
Figure 6F:
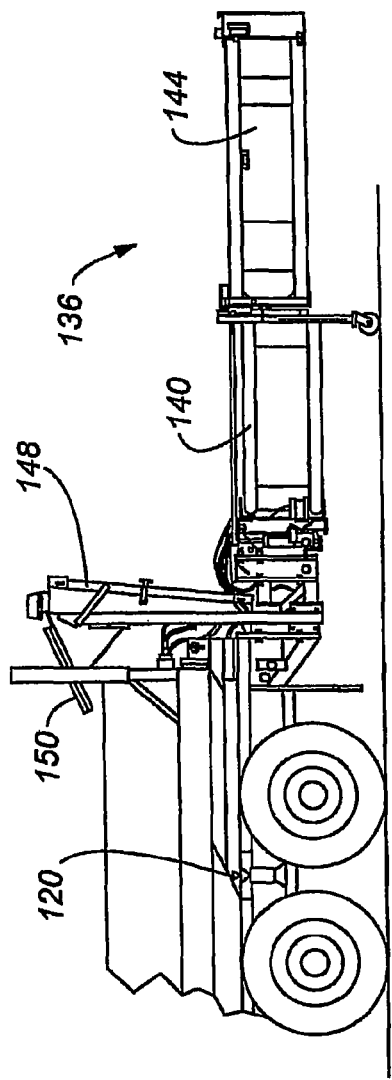
Figure 6G:
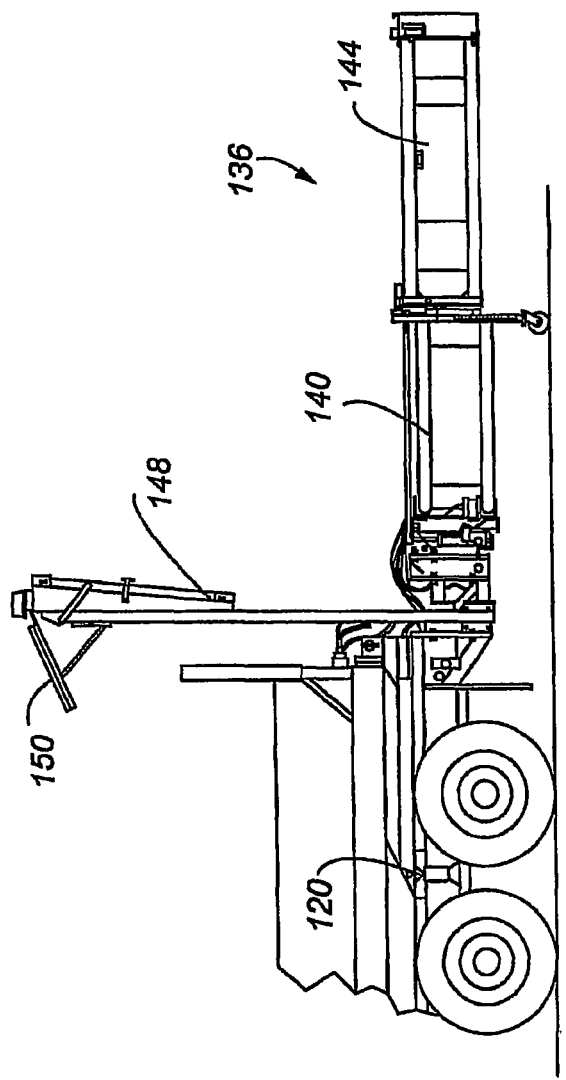

The deployment of the truck mounted attenuator 136 and the electronic billboard and light bar 148 is illustrated in FIGS. 6A-6G. As shown in FIG. 6A through FIG. 6F, the truck mounted attenuator 136 is extended and lowered into a position wherein both the first portion 140 and the second portion 144 are substantially horizontal and proximate to the ground. As shown in FIG. 6G, the electronic billboard 148 and light bar 150 are then raised. Referring to FIG. 7, the TMA 136 is typically bolted by a bracket 700 to the caboose 120. The TMA is thus readily removable simply by unbolting the TMA from the vertical plate of the bracket 700. Additionally, the bracket 700 and associated components provide a means for attaching the electronic billboard 148 and light bar 150 to the caboose 120. The bracket 700 is mounted to provide a desirable height for the truck mounted attenuator in its deployed position, more specifically, approximately ten to eleven inches off of the ground. The bracket 700 is additionally mounted to provide visibility of the caboose brake lights and other warning lights associated with the trailer 100. In FIG. 1C, a rear view of the loaded trailer 100 is illustrated. As shown herein, the truck mounted attenuator 136 is raised into its tracked position. As can be seen, the brake lights 152 of the caboose 120 are visible underneath the truck mounted attenuator 136. A beacon 156 is also visible, despite the presence of the truck mounted attenuator 136. The beacon 156 provides a visual indication of an end portion of the trailer 100. As with the caboose 120, the truck mounted attenuator 136 may be associated with either of the two platforms 104 and thereafter either end of the trailer.

Turning now to FIG. 8, a forced air system 800 in accordance with an embodiment is shown. The forced air system 800 includes two lever attenuators 804 operable to lock the brakes of the caboose 120 independently of the brakes of the tractor 116. As used herein, locking the brakes includes disconnecting or disabling the automatic brake system, typically associated with the caboose 120. Here, the brakes are forced into a locked position, thereby locking or preventing movement of the caboose 120. Also shown in FIG. 8 is a knob 808 operable to control the inflation and/or deflation of the moveable pistons 508. As described above, the pistons 508 are used to provide a finer grade vertical adjustment of the balancing of the protective barrier 200 by vertically lifting or lowering a selected side of the caboose and interconnected platform. In other words, inflating the piston on a first side of the caboose lifts the first side of the platform relative to the second side of the platform and vice versa. In accordance with embodiments, the air provided to the pistons 508 is delivered from an air supply associated with the trailer 116 and not from an air compressor.

The interconnection between the platform 104 and the king pin plate 500 is illustrated in FIG. 8. A removable pin interconnects the platform to the caboose. The pin is removable, and may be locked in place with attachment member 802.

Figure 9:
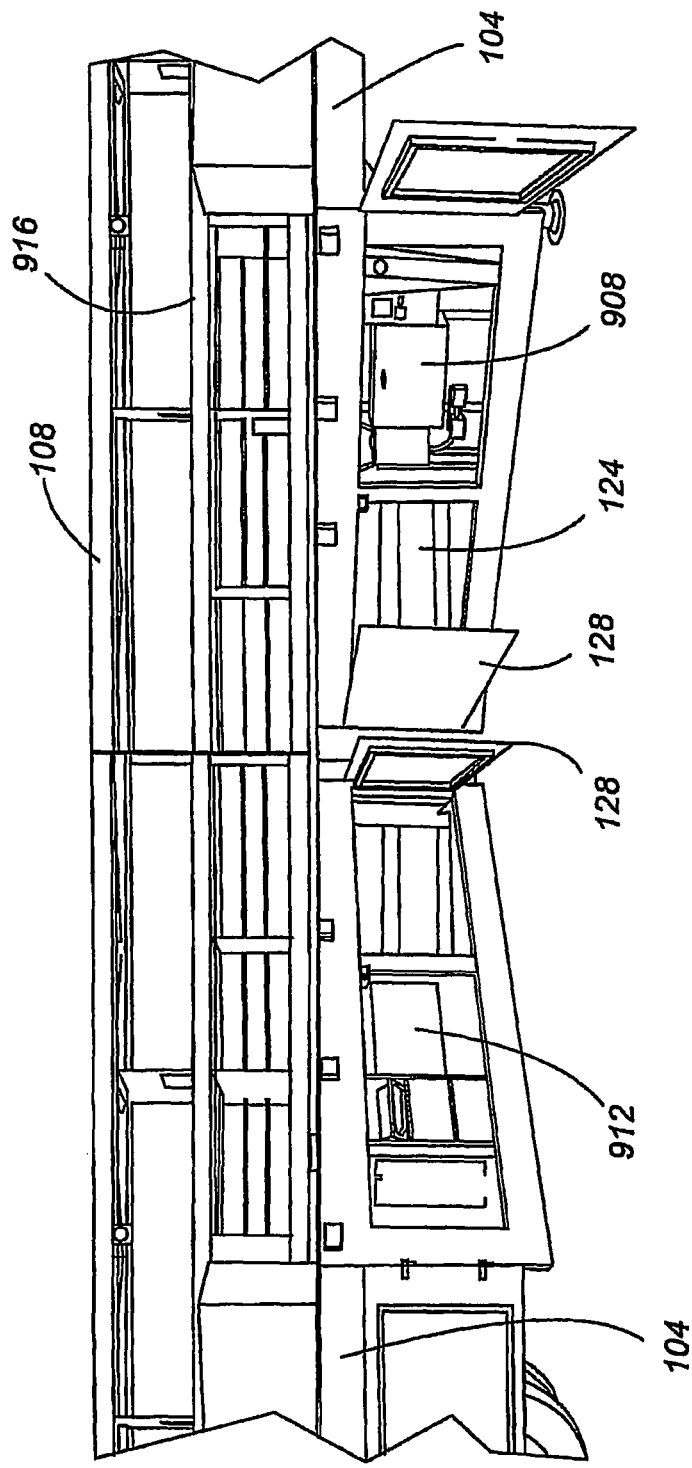
FIG. 9 shows the loaded trailer, including a storage compartment.

Turning now to FIG. 9, a loaded trailer 100 is shown from the work area-side of the trailer 100. As shown herein, the wall sections 108 are loaded on top of the platforms 104 and the platforms 104 are interconnected. As described above, this loaded position corresponds to an arrangement of the various components, which can be used to transport the entire system. As shown in FIG. 9, the platform includes a storage compartment. Various auxiliary components described herein are stored in this storage compartment 124. As can be seen in FIG. 9, such components, as the light poles 900, the corresponding lights themselves 904, the visual barrier 220, as well as various electrical components, are shown inside of the compartment. For example, FIG. 9 includes an onboard computer 908 and a generator 912. In this configuration or in the deployed configuration, various lines 916, such as electrical lines or air lines, may run along the length of a wall section 108 through the various adjacent conduit boxes 308.

Figure 10:
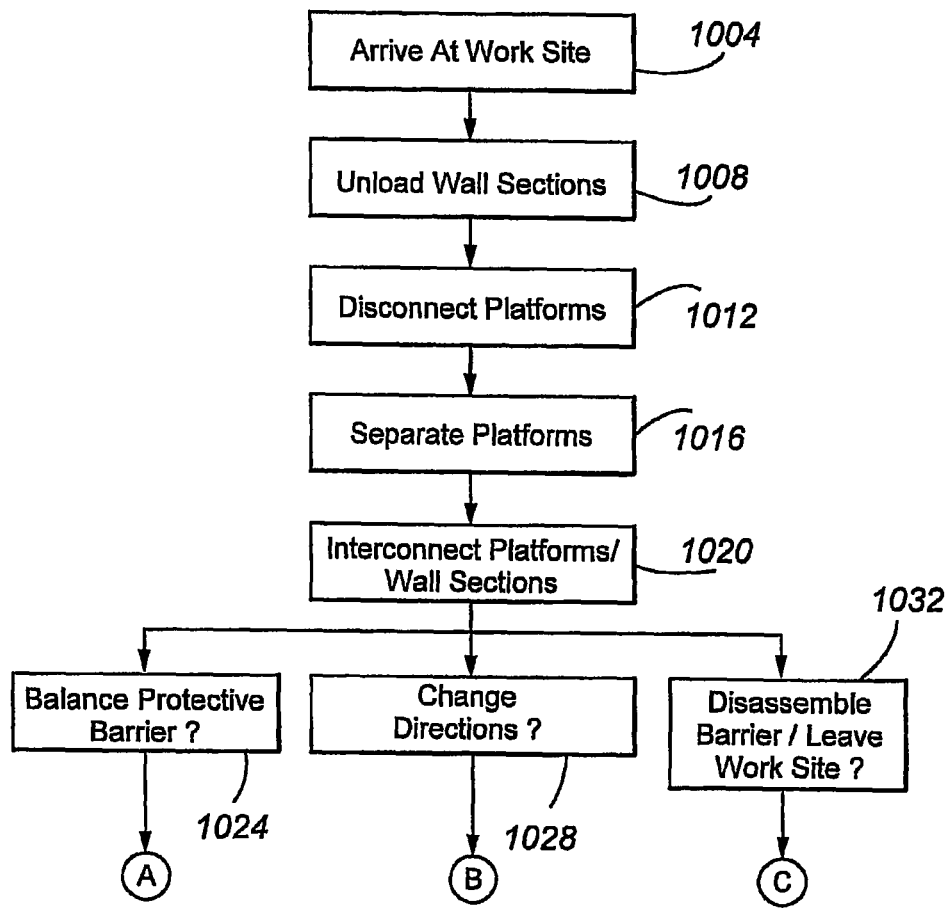
FIG. 10 is a flow chart illustrating a method of deploying a protective barrier.

Referring now to FIG. 10, a flow chart is shown which illustrates the steps in a method of deploying a mobile barrier in accordance with an embodiment. Initially at step 1004, the trailer arrives at a worksite. At step 1008, the wall sections 108 are unloaded from the trailer bed. This may be done with the use of cranes, a fork lift, and/or other heavy equipment operable to remove and manipulate the weight associated with the wall sections 108. At step 1012, the platforms 104 are disconnected from each other. More particularly, the bolt connections that interconnect the platforms 104 are removed. At step 1016, the platforms 104 are separated. Here, the brakes of the caboose 120 may be locked and the disconnected platform portion of the trailer 116 attached to the tractor 116 may be driven away from the location of the caboose 120 and its attached platform. A dolly or castor wheel may be connected to the end of the platform 104 to provide mobility for the portion of the platform 104 attached to the tractor 116, thereby allowing the platform to move into position to be engaged with the end wall section. Alternatively, a first platform connected to the tractor 116 is positioned at the desired location before disconnection of the platforms. Jacks attached to the first platform are lowered into position with the roadway. The platforms are then disconnected, with the second platform being supported by the caboose. A forklift or other vehicle is used to move the second platform into position for connection with the wall sections. In any event at step 1020, the platforms 104 and wall sections 108 are interconnected to form a protective barrier 200. At this point a continuous protective barrier 200 is formed from the various components of the trailer. Next, a number of steps or operations may be employed. At step 1024, it may be determined that the protective barrier 200 must be balanced. More particularly, the weight of the protective barrier 200 must be adjusted such that the protective barrier 200 wall comes into a substantially vertical alignment. If no balancing of the protective barrier 200 is needed, work may be commenced within the protected area 204 of the protective wall 200. At step 1028, it may be determined that the direction or orientation of the protective barrier 200 may need to be changed. This may be done by jacking the second platform, disconnecting the caboose, and reversing the positions of the tractor 116 and caboose 120. Alternatively, the jack stands may be retracted and the truck, while the wall sections are deployed, driven, while attached to the barrier, to a new location. At step 1032, work may be completed and the protective barrier 200 may then be disassembled for transport.

Figure 11:
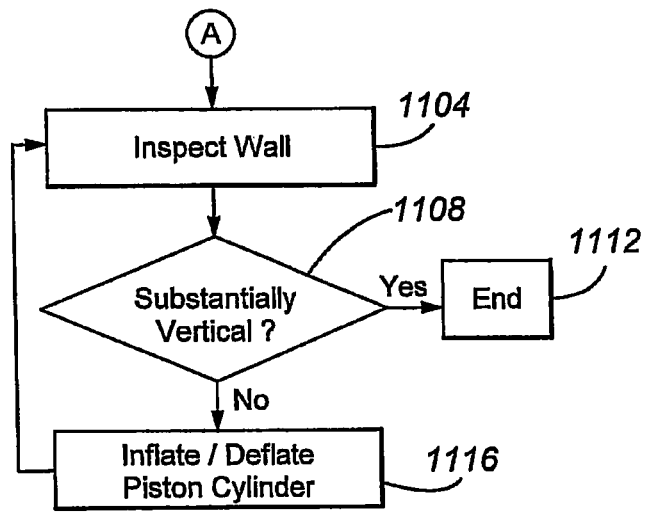
FIG. 11 is a flow chart illustrating a method of balancing the weight of a protective barrier.

Turning now to FIG. 11, a method of balancing a protective barrier 200 (step 1024) is illustrated. This method assumes that the ballast boxes are not adequate to counter-balance completely the deployed barrier. At step 1104, the protective barrier 200 or wall is inspected to determine whether or not the wall is disposed at a substantially vertical orientation. This can be done using a manual or automatic level detection device. If at decision 1108 the wall is substantially vertical, step 1112 follows. At step 1112 the process may end. If at decision 1108, it is determined that the wall is not substantially vertical, step 1116 follows. At step 1116, one or more of the piston cylinders 508 are inflated or deflated to provide a counter balance to the weight of the protective barrier 200 and desired barrier 200 orientation.

Figure 12:
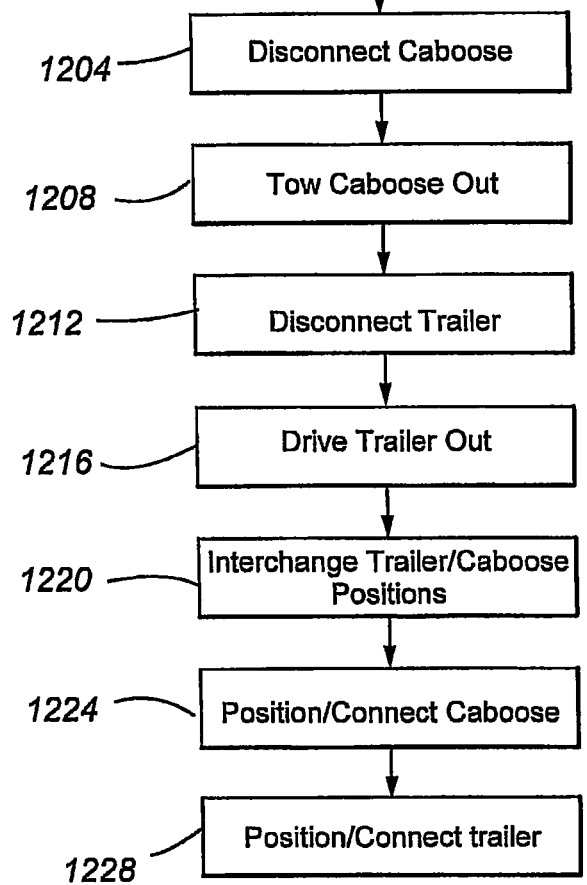
FIG. 12 is a flow chart illustrating a method of changing the orientation of a protective barrier/trailer.

FIG. 12 illustrates a method of changing directions for the protective barrier 200. Initially, at step 1204, the caboose-engaging platform is placed on jack stands and thereafter the caboose is disconnected from the platform to which it is attached. At step 1208, the caboose is towed out from underneath the platform 104. Here, the caboose 120 may be connected to or otherwise attached to a tractor, forklift, or pickup truck, which is operable to tow the caboose 120. At step 1220, the tractor-engaging platform is placed on jack stands and the tractor 116 is disconnected from the platform 104 to which it is attached. At step 1216, the tractor 116 is driven out from underneath the platform 104. At step 1220, the positions of the caboose 120 and tractor 116 are interchanged. At 1224, the caboose 120 is positioned underneath and connected to the platform 104 to which the tractor 104 was formally attached. As described above, this includes a nose receiver portion 404, providing guidance to the caboose 120 in order to guide the king pin 400 into the king pin receiver channel 532 associated with the king pin plate. At step 1228, the tractor 116 is positioned with respect to and connected to the platform 104 to which the caboose 120 was formally attached.

Figure 13:
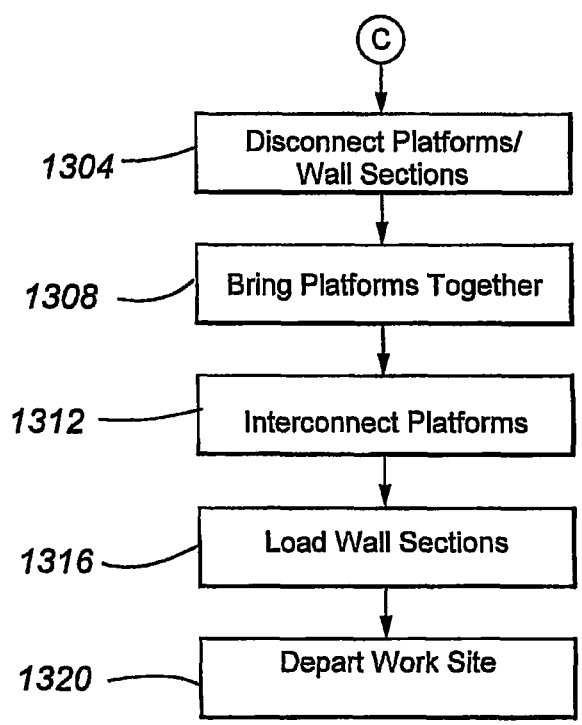
FIG. 13 is a flow chart illustrating a method of disassembling a protective barrier and loading the component parts for transport.

Referring now to FIG. 13, a method of loading a trailer in accordance with embodiments is illustrated. Initially at step 1304, the platforms 104 and wall sections 108 are placed on jack stands and disconnected from one another. This includes removing the bolt connections which interconnect the opposing faces of the platforms 104 and/or wall sections 108. At step 1308, the platforms 104 are brought together. As described above, this includes interconnecting a castor or dolly wheel to at least one platform end and driving the platform 104 in the direction of the opposing platform. Alternatively, the platform engaging the caboose is taken off of its jack stands and maneuvered by a vehicle to mate with the other, stationary platform. At step 1312, the platforms 104 are interconnected by such means as bolting the platforms together. At step 1316, the wall sections 108 are loaded onto the truck bed. Because the ballast boxes typically do not counter-balance precisely the loaded wall sections and vice versa, the piston cylinders 508 are inflated or deflated, as desired, to provide a level ride of the trailer. Finally, at step 1320, the trailer 100 departs from the worksite. In one configuration, castor or dolly wheels may be put on each of the two platforms so that, when they are disconnected from end wall sections of the barrier, the first and second platforms may be moved into engagement with and connected to one another. The wall sections may then be disconnected from one another and loaded onto the connected platforms.

The above discussion relates to a mobile barrier in accordance with an embodiment that includes a number of interconnectable wall sections, which are, in one configuration placed on the surface of a truck bed. In a second configuration, these wall sections are removed from the truck bed and interconnected with portions of the trailer to form a protective barrier. In this way, a fixed wall is formed that provides protection for a work area. The present invention can provide a non-rotating wall that is deployed to form the protective barrier. Alternative embodiments of a fixed wall mobile barrier are illustrated in FIGS. 14A-C and FIGS. 15A-C.

Figure 14A:
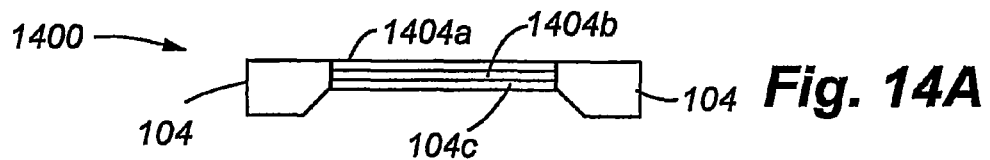
FIGS. 14A-C are illustrations of a fixed wall protective barrier in accordance with alternative embodiments of the present invention.
Figure 14B:
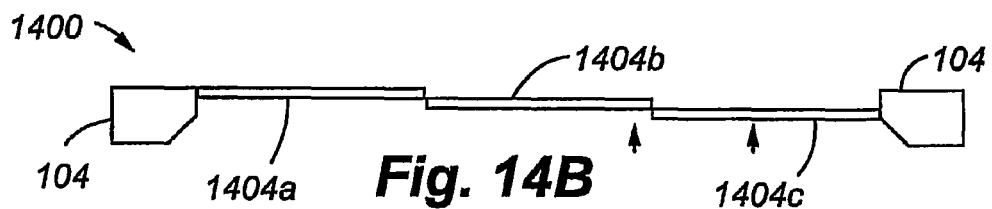
Figure 14C:
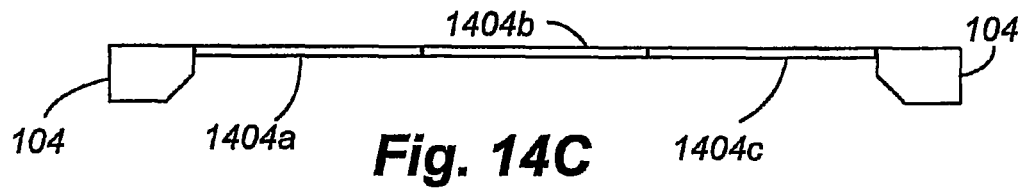

FIGS. 14A-C illustrate a "sandwich" type extendable protective wall. As shown in FIG. 14A, the mobile barrier 1400 includes two platforms 104 and three interconnected wall sections 1404a, 1404b and 1404c. FIG. 14A illustrates a contracted or retracted position wherein the wall sections 1404a-c are disposed adjacent to one another in a "sandwich position". FIG. 14B illustrates an intermediate step in the deployment of the mobile barrier 1400. Here, the platforms 104 are moved away from each other and the sandwiched wall sections extended. From this intermediate position, the sections 1404a and 1404c move forward to a position adjacent to the forward position of the wall section 1404a. In accordance with embodiments, the wall sections 1404a-c are disposed on sliding rails which allow the displacement shown in FIG. 14B-C. Additionally between wall sections 1404a and 1404a (similarly 1404b and 1404c) an articulating mechanism is provided, which allows motion between the adjacent wall sections. FIG. 14C shows the final position of the mobile barrier 1400. Here, the various wall sections 1404a-c and the platforms 104 provide a continuous mobile barrier included a protected work space.

Figure 15A:
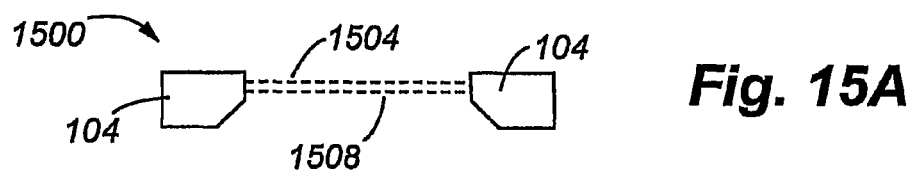
FIG. 15A-C are illustrations of a fixed wall protective barrier in accordance with another alternative embodiment of the present invention.
Figure 15B:
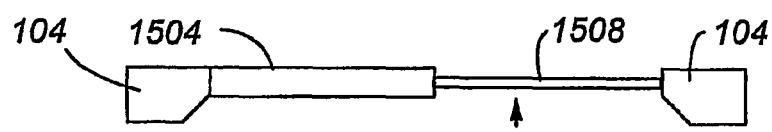
Figure 15C:
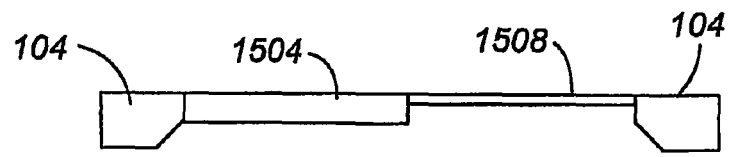

FIGS. 15A-15C illustrate a telescoping type protective wall system 1500. FIG. 15A shows a retracted, or closed, position of the protective barrier 1500. The protective barrier includes opposing platforms 104. The protective barrier in this embodiment includes two wall sections, the first wall section 1504 encloses the second wall section 1508 in the contracted position shown in FIG. 15A. In the intermediate position shown in FIG. 15B, the second wall section 1508 is extended outward from the first wall section 1504 in a telescopic manner. In the final position shown in FIG. 15C, the second wall section 1508 moves forward to a position adjacent to the first wall section 1504. In the final position shown in FIG. 15C, the first wall section 1504, second wall section 1508 and portions of the two platforms 104 form a continuous protective barrier including protective interior space.

A number of alternative caboose embodiments will now be discussed.

Figure 16:
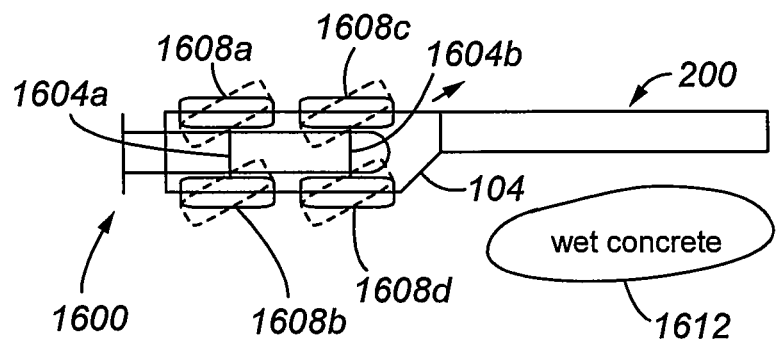
FIG. 16 shows a configuration of the caboose according to an embodiment.

Referring to FIG. 16, the caboose 1600 has one or more steerable or articulating axles 1604a,b or wheels 1608a-d to avoid a selected area 1612, such as a work area containing wet concrete. The wheels 1608a-d are turned to a desired orientation, which is out of alignment with the tractor 116 tires, so that, when the trailer is pulled forward by the tractor 116, the trailer moves both forward and laterally out of alignment with the path of movement of the tractor 116. This may be effected in many ways. In one configuration, steering arms (not shown) are attached to the axles 1604, and the arms are controlled by electrically operated hydraulic cylinders incorporated into the caboose frame assembly. The caboose axles are turned out when pulling ahead to more quickly move the rear of the trailer out and away from the area 1612. Once the tractor and trailer are out of alignment with the area 1612, the axles are returned, such as by the hydraulics, to their original positions in alignment with the tractor wheels. The electronics controlling the hydraulics are controlled from the tractor cab or a special switch assembly located in the caboose or on the trailer near the caboose. Alternatively, the axles or wheels may be steered manually, such as by a steering wheel mounted on the platform or caboose. The nose portion of the caboose remains stationary in the members 404a,b, or the caboose does not rotate about the kingpin but remains aligned with the longitudinal axis of the trailer throughout the above sequence.

Figure 17:
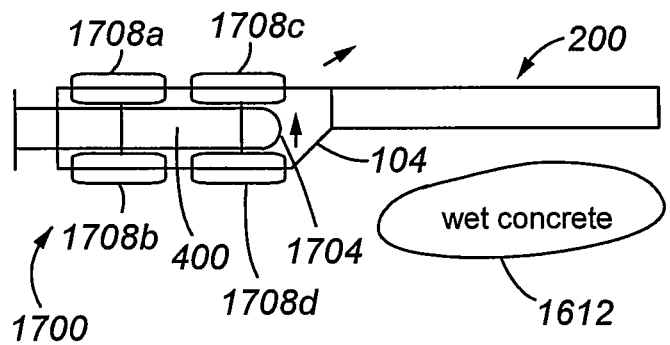
FIG. 17 shows a configuration of the caboose according to an embodiment.

Referring to FIG. 17, the caboose 1700 articulates or rotates about the king pin 400. One or more electrically driven hydraulic cylinders at the front of the caboose laterally displaces the nose 1704 in a desired orientation relative to the longitudinal axis of the trailer. When the caboose is rotated to place the wheels 1708a-d in a desired orientation, which is out of alignment with the tractor 116 tires, the tractor pulls the trailer forward. The trailer moves both forward and laterally out of alignment with the path of movement of the tractor 116. The hydraulics then push the nose of the caboose to the aligned, or normal, orientation in which the wheels of the caboose are in alignment with the wheels of the tractor. The hydraulic cylinder(s) can be connected directly to a front pivot (not shown) or incorporated into the nose portion or the current "V" wedge assembly, which includes the members 404a,b. In the latter design, the members 404a,b are mounted on a movable plate, and the hydraulic cylinder(s) move the plate to a desired position while the nose portion 1704 is engaged by, or sandwiched between, the members 404a,b. Unlike the prior caboose embodiment, the caboose rotates about the kingpin and does not remain aligned with the longitudinal axis of the trailer throughout the above sequence.

Figure 18:
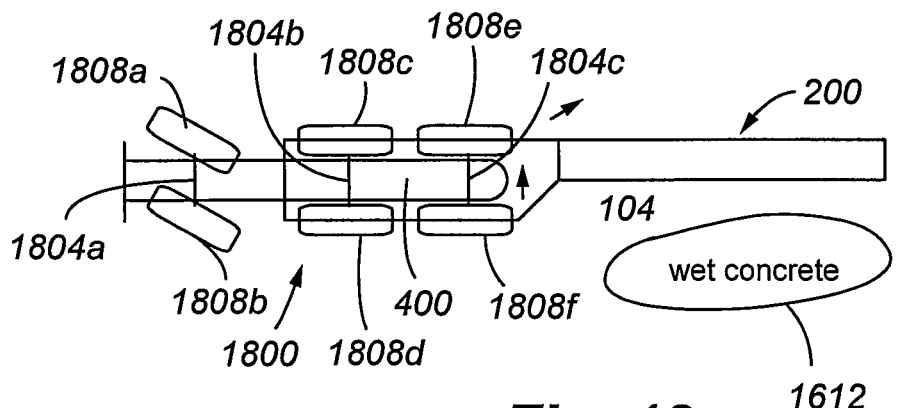
FIG. 18 shows a configuration of the caboose according to an embodiment.

Referring to FIG. 18, the caboose 1800 has an elongated frame with articulated steering on one or more axles 1804a-c, with the rear axle 1804a being preferred. When only the rear axle is steerable, the axle 1804a is steered, as noted above, to place the wheels 1808a,b in the desired orientation. After the caboose is rotated to place the wheels 1808a,b in a desired orientation, which is out of alignment with the tractor 116 tires, the tractor pulls the trailer forward. The trailer rotates about the king pin 400 and moves both forward and laterally out of alignment with the path of movement of the tractor 116. The wheels 1808 are then moved back into alignment with the wheels of the tractor. Like the prior embodiment, the caboose rotates about the kingpin and does not remain aligned with the longitudinal axis of the trailer throughout the above sequence. To make this possible, the nose portion of the caboose may need to be removed from engagement with the members 404a,b, such as by moving a movable plate, to which the members are attached, away from the nose portion.

In another embodiment, the caboose is motorized independently of the tractor. An engine is incorporated directly into the caboose to provide self-movement and power. In one configuration made possible by this embodiment, the platforms could engage simultaneously two cabooses with a TMA positioned on each caboose to provide crash attenuation at both ends of the trailer. One or both of the cabooses is motorized. This is particularly useful where the trailer may be on site for longer periods and needs only nominal movement from time-to-time, such as at gates, for spot inspection stations, or for security and/or military applications where unmanned and/or more protected movement is desired.

In other embodiments, the caboose is attached permanently to the platform. In this embodiment, different tractor/trailers, that are mirror images of one another, are used to handle roadside work areas at either side of a roadway.

The present invention, in various embodiments, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A safety trailer, comprising:
   (a) first and second platforms, at least one of said first and second platforms having an axle and wheels attached thereto and at least one of the first and second platforms having a king pin at an end thereof;
   (b) a plurality of interconnected wall sections positioned between and connected to the first and second platforms, the plurality of wall sections defining a protected work area on a side of the trailer;
   (c) and wherein each wall section has a longitudinal member extending a length of the wall section, the longitudinal member being positioned at the approximate position of a bumper of a vehicle colliding with the wall section; and
   (d) a removable caboose engageable with the king pin, the caboose having a fixed king pin plate, a nose portion and at least one axle and wheels, wherein said fixed king pin plate distributes at least a portion of the force of a vehicle colliding with the safety trailer, the caboose further comprising at least one of: a vertical adjustment member adapted to maintain a level ride height, provide additional ground clearance and level the caboose; and an auxiliary mechanism adapted to engage a caboose brake system.

2. The trailer of claim 1, wherein the selected wall section comprises an outer plate covering a length of the wall section and engaging the longitudinal member.

3. The trailer of claim 1, wherein the trailer supports a ballast member, the ballast member being positioned near a first side of the trailer and the plurality of wall sections near a second, opposing side of the trailer, the ballast member offsetting, at least partially, a weight of the plurality of wall sections.

4. The trailer of claim 3, wherein the ballast member is on a first side of a longitudinal axis of the trader and the plurality of wall sections on a second opposing side of the longitudinal axis.

5. The trailer of claim 1, wherein the interconnected wall sections slidably engage one another.

6. The trailer of claim 1, wherein the interconnected wall sections telescopically engage one another.

\* \* \* \* \*